(12) United States Patent
Golovchinsky et al.

(10) Patent No.: US 7,266,765 B2
(45) Date of Patent: Sep. 4, 2007

(54) DETECTION AND PROCESSING OF ANNOTATED ANCHORS

(75) Inventors: Gene Golovchinsky, Palo Alto, CA (US); Catherine Claire Marshall, San Francisco, CA (US); Morgan N. Price, Lafayette, CA (US); William N. Schilit, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 694 days.

(21) Appl. No.: 09/944,817

(22) Filed: Aug. 31, 2001

(65) Prior Publication Data
US 2004/0078757 A1    Apr. 22, 2004

(51) Int. Cl.
G06F 17/00    (2006.01)
(52) U.S. Cl. ................................ 715/512; 715/513
(58) Field of Classification Search ............. 715/512, 715/513
See application file for complete search history.

(56) References Cited

U.S. PATENT DOCUMENTS

| | | | | |
|---|---|---|---|---|
| 5,559,942 | A * | 9/1996 | Gough et al. | 345/802 |
| 5,822,539 | A * | 10/1998 | van Hoff | 709/236 |
| 5,889,523 | A | 3/1999 | Wilcox | 345/357 |
| 5,903,729 | A * | 5/1999 | Reber et al. | 709/219 |
| 6,279,014 | B1 * | 8/2001 | Schilit et al. | 715/512 |
| 6,572,661 | B1 * | 6/2003 | Stern | 715/501.1 |
| 6,651,058 | B1 * | 11/2003 | Sundaresan et al. | 707/6 |
| 2001/0056439 | A1 * | 12/2001 | Carro | 707/500.1 |
| 2002/0052890 | A1 * | 5/2002 | Ingram et al. | 707/500.1 |
| 2002/0059333 | A1 * | 5/2002 | Tribbeck | 707/500 |
| 2002/0091679 | A1 * | 7/2002 | Wright | 707/3 |
| 2003/0018632 | A1 * | 1/2003 | Bays et al. | 707/3 |

OTHER PUBLICATIONS

DeRose, Steven J., "XML Linking", ACM Computing Surveys (CSUR), Dec. 1999, pp. 1-12.*
Fielding, Roy T., et al, "Web-Based Development of Complex Information Products", Communications of the ACM, vol. 41, Issue 8, Aug. 1998, pp. 84-92.*
U.S. Appl. No. 08/929,426, filed Sep. 15, 1997, Schilit.
U.S. Appl. No. 09/222,962, Dec. 30, 1998. Schilit.
U.S. Appl. No. 09/244,768, filed Feb. 5, 1999, Golovchinsky.
Bernstein, M., *Eastgate Web Squirrel*, http://www.eastgate.com/squirrel/, printed Jan. 29, 2002.
Bollacker, Kurt D., et al., "CiteSeer: An Autonomous Web Agent for Automatic Retrieval and Identification of Interesting Publications,"ACM Press, New York, pp. 116-123 (1998).
Card, S.K., et al., "The WebBook and the Web Forager: An Information Workspace for the World-Wide Web," In *Proceedings of CHI96* (Vancouver, BC Apr. 13-18), ACM Press (1996).

(Continued)

Primary Examiner—Heather R. Herndon
Assistant Examiner—Laurie Ries
(74) Attorney, Agent, or Firm—Fliesler Meyer LLP

(57) ABSTRACT

A system, apparatus, and article of manufacture for detecting a reader's interest in a particular external document through their markings and annotations, and processing the marks in various ways, is provided. By detecting anchors proximal to annotations made by a reader, a collection of the annotated anchors and the related documents may be organized and generated for a reader to process according to their desires.

55 Claims, 17 Drawing Sheets

OTHER PUBLICATIONS

Consens, M.P., et al., "Architecture and Applications of the Hy+ Visualization System," *IBM Systems Journal*, 33 (3), 458-476 (1994).

Giles, C.L., et al., "CiteSeer: An Automatic Citation Indexing System," *In Proceedings of ACM Digital Libraries '98* (Pittsburgh, PA, Jun. 23-26, 1998), ACM Press, 89-98.

Marshall, C.C., et al., "VIKI: Spatial Hypertext Supporting Emergent Structure," In Proceedings of the European Conference on Hypertext 1994 (Edinburgh, Scotland, Sep. 19-23, 1994), ACM Press, 13-23.

Robertson, G., et al., "Data Mountain: Using Spatial Memory for Document Management," *In Proceedings of UIST98* (San Francisco, CA Nov. 2-4, 1998), ACM Press, 153-162.

Röcheisen, M., et al., "Shared Web Annotation as a Platform for Third-Party Value-Added Information Providers: Architecture, Protocols, and Usage Examples," Technical Report STAN-CS-TR-97-1582, Stanford Integrated Digital Library Project, Computer Science Dept., Stanford University. Nov. 1994, updated Apr. 1995.

Schilit, B.N., et al. "Beyond Paper: Supporting Active Reading With Free Form Digital Ink Annotations," *In Proceedings of CHI*, 1998.

Schilit, B.N., et al., "Digital Library Information Appliances," *In Proceedings of Digital Libraries '98* (Jun. 23-26, 1998 Pittsburgh, PA), ACM Press, pp. 217-225.

Schilit, B.N., et al., "TeleWeb: Loosely Connected Access to the World Wide Web," Fifth International World Wide Web Conference, May 6-10, 1996, Paris, France.

Webman, *Anigma Inc.*, http://www.anigma.com/webman.html, printed Jan. 30, 2002.

Zellweger, P.T., et al., "Fluid Links for Informed and Incremental Link Transitions," *In Proceedings of the Ninth ACM Conference on Hypertext*, p. 50-57, 1998.

* cited by examiner

Fig. 1

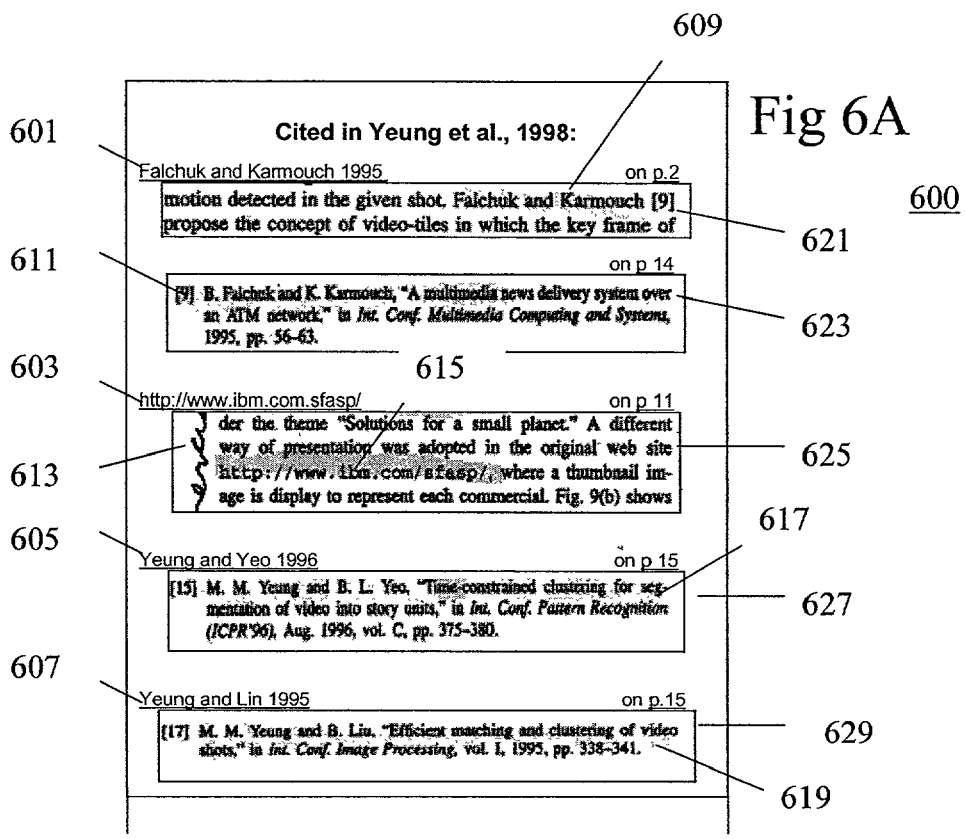
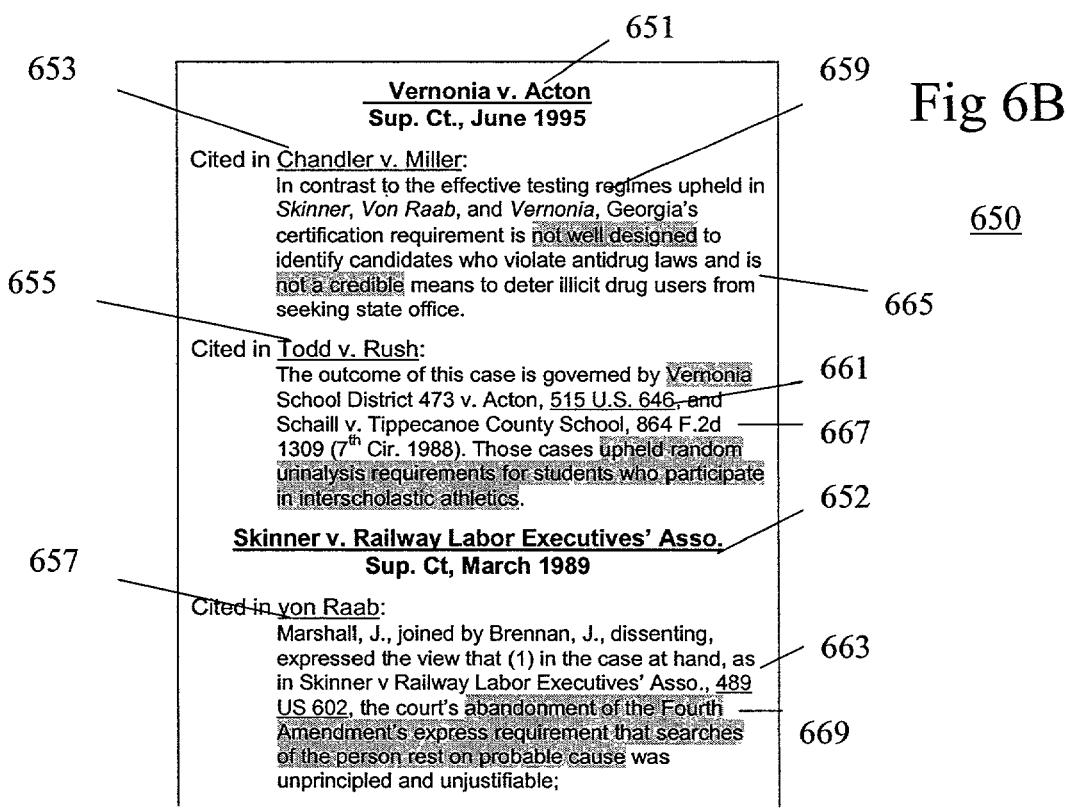

a shot with irregular lines as an indication of the camera motion detected in the given shot. Falchuk and Kannouch [9] propose the concept of video-tiles in which the key frame of

[9] B. Falchuk and K. Karmouch, "A multimedia news delivery system over an ATM network," in *Int. Conf. Multimedia Computing and Systems*, 1995, pp. 56-63.

The second problem affects the reader more than the author. Very large collections of texts can be expected to contain vast numbers of potentially useful links. Unfortunately, most links would not be useful most of the time, and their sheer number can overwhelm even the most careful user interface design. Thus alternatives to semi-automatic link generation must be found.

1.2 Information retrieval and hypertext

The link creation problems described above suggest that more traditional information retrieval techniques must be used to accommodate large collections of nodes. Information retrieval methods have been applied to hypertext databases in several ways: link information has been used to inform retrieval algorithms (e.g., [8], [14], [19], [13], [36]), term co-location information has been used to suggest links to human authors (e.g., [2], [4], [32]), and queries have been used to retrieve hypertext nodes (e.g., [9], [12], [6], [5]). Relevance feedback has also been used to guide retrieval and to infer links among documents (e.g., [3]). Most systems that use queries as navigational aids use them to identify relevant neighborhoods in the hypertext, and then rely on manually-created links to support further navigation.

IR techniques have been used to segment long articles into shorter, more focused nodes (e.g., [34], [22]). Similarity among passages has been used to create links between specific nodes. This work, however, has focused on text segmentation techniques rather than on the hypertext interface. Although it is clear that such approaches are promising, little evidence has been published to date regarding their integration into interactive hypertext systems and about the effectiveness of such techniques in support of interactive browsing.

SuperBook, one of the more successful query-mediated browsing systems, used keyword queries instead of static hypertext links as a navigation mechanism [31]. Information was presented to the user in several windows, including table of contents (TOC), query, and text viewed. Users could use the TOC hierarchy to arrive at the desired section, or they could type in queries (or select keywords in the text). Search results were used to annotate the TOC to indicate relevant passages. Thus the system achieved hypertext-like browsing by combining TOC-based navigation with full-text search.

SuperBook's reliance on the table of contents to organize the browsing session limits it to providing access to highly-structured documents. Although an extension to SuperBook that works across documents has been demonstrated [28], it still relies on hierarchical structure of each document to support local navigation. SuperBook has been shown to be an effective interface for IR tasks when browsing structured collections [12], but alternatives to the book metaphor must be found to support browsing through loosely-structured hypertext collections.

One such alternative — the newspaper metaphor — is discussed in the following section, and VOIR, a prototype that implements it, is described. Some experimental results from an evaluation of VOIR are presented, and the paper concludes with a discussion of possible extensions and applications of this query-mediated hypertext interfaces.

2 VOIR

This section describes VOIR (Visualization of Information Retrieval), a prototype newspaper-based dynamic hypertext interface. The section first introduces the newspaper metaphor and discusses its implementation in VOIR. A description of VOIR's linking interface follows, and the discussion concludes with an overview of VOIR's visualization features.

2.1 The newspaper metaphor

Newspapers such as the Wall Street Journal are designed to present a variety of different, loosely-related articles in a manner that supports browsing and selective reading. The front page of each newspaper section provides an overview of the contents. It presents summaries of articles, with references to other pages where additional details are discussed. The layout of each broadsheet provides cues to the relative importance of articles: important articles are usually placed near the top of the page, and more column space is allocated to them. These layout features serve to alert the reader to potentially useful information, and to structure interaction with a text that does not possess an overall narrative.[1]

These features of a newspaper make it an appropriate vehicle for displaying hypertext information [18]. Users can capitalize on their familiarity with newspapers to browse hypertext collections. In addition to providing similarity-based structure, the newspaper metaphor can support the notion of landmark nodes [29] and hypertext links. The front page of a newspaper serves as a landmark around which semantically-related articles are organized. Articles split among several pages are connected with links. Overviews of contents are quite common. This

---

[1] Each article, of course, has an internal structure. The newspaper merely serves to bind these largely-independent narratives together.

FIG. 17

DETECTION AND PROCESSING OF ANNOTATED ANCHORS

FIELD OF THE INVENTION

The invention, roughly described, is directed to a system for recognizing annotated anchors in documents, and subsequently processing the annotated anchors.

BACKGROUND

Active reading of conventional, paper documents often involves marking or annotating text by a reader as they read using a number of methods, the most obvious of which is to highlight the text to or place a written notation adjacent to the text. Typical annotations include margin notes, vertical bars, graphic notations, highlights, underlines, circles, etc. References to external documents (ex: hypertext documents, footnotes, etc.) in text generally stand out due to their grammatical citation which creates a visual and contextual distinction from the surrounding text.

There are several currently existing techniques available to users for annotating documents. For example, methods exist for annotating online documents using a web browsing facility, electronic meeting systems (e.g. the "whiteboard" feature in Microsoft's Netmeeting™), and through word processing software. In some of the more basic systems, annotation of documents may comprise manually listing the documents (by writing on paper, using the cut and paste feature of an operating system clipboard, or using the book marking function of the browser), none of which leaves a persistent trace within the displayed document.

More advanced annotation techniques exist for digitally marking documents, such as the method of digital ink as described in Schilit et al., Beyond Paper: Supporting Active Reading with Free Form Digital Ink Annotations, Proceedings of CHI98. These more advanced systems reduce the amount of reader interruption which often results from basic annotation techniques.

Systems also exist for detecting the annotation context and organizing those annotations for the user by displaying a list of just the annotated passages. For example, in U.S. Pat. No. 6,279,014, filed Sep. 15, 1997, a technique for organizing annotations in the context of the document in which they appear is described. Other systems, such as the one described in U.S. patent application Ser. No. 09/222,962 filed Dec. 30, 1998, provide a method for maintaining freeform ink annotations on changing views. This technique involves maintaining freeform ink annotations on changing views by anchoring ink strokes to specific objects that can move around or change size.

Each of these techniques reduces reading interruption and provides readers with an overview of the annotated portions of a document. However, in electronic documents, users are often presented with the decision of whether to follow a link contained within the document or to continue reading. If a reader decides to follow the link, the current document is often replaced by the target document, thus interrupting reading flow. Alternatively, if the reader decides not to follow the link and continues reading, the reader may forget to return and follow the link, may be unable to remember why the link was interesting, or may not be able to locate the link.

Many strategies are used by readers presented with such decisions. One is the "read first, follow links later" strategy. Under this strategy a reader will read the entire document and then return and follow the links they found interesting. This strategy relies on a reader's ability to remember which links were interesting, and where in the document they were located.

Another strategy is to "follow links as they are encountered." Using this strategy a user follows links they find interesting as they approach each link. In addition to interrupting the flow of reading, another problem with this strategy is that it may result in a reader losing track of the original document. Often when a link is followed the original document is removed from the viewing area and replaced with the target of the link.

Another strategy for managing the task of reading documents containing links is to gather the links using a link-gathering interface. Examples of conventional link gathering interfaces include the bookmark facility of Web browsers, and spatial hypertexts such as VIKI (Marshall, C. C., Shipman, F. M. III and Coombs, J (1994) VIKI: Spatial Hypertext Supporting Emergent Structure. In Proceedings of The European Conference on Hypertext 1994 (Edinburgh, Scotland September 19–23): ACM Press, 13–23.); Data Mountain (Robertson, G. G. (1998) Data Mountain: Using Spatial Memory for Document Management. In Proceedings of UIST98 (San Francisco, Calif. November 2–4), ACM Press, 153–162.); Web Squirrel (Bernstein, 1998, http://www.eastgate.com/squirrel/); and Web Forager (Card, S. K., Robertson, G. G., and York, W. (1996) The WebBook and the Web Forager: An Information Workspace for the World-Wide Web. In Proceedings of CHI96 (Vancouver, BC April 13–18), ACM Press, 11–117.). While this type of explicit link gathering may be less computationally intensive than annotation processing, it is more difficult on the user for whom annotation is a generally intuitive and well-honed skill.

Still other systems maintain annotations on Web pages that may change unpredictably, but such systems have not considered processing the annotations that are near anchors. For example, Equill visual markup, (www.equill.com), and I-markup (www.imarkup.com) associate freeform ink annotations with objects in a Web page, but do not allow a reader to manipulate documents based on these marks.

Additionally, a number of systems that provide hypertext graph searching capability have been described in literature (e.g., Consens, M. P., Eigler, F. Ch., Hasan, M. Z., Mendelzon, A. O., Noik, E. G., Ryman, A. G., and Vista, D. (1994) Architecture and Applications of the Hy+ Visualization System, IBM Systems Journal, 33 (3), 458–476). Such tools allow the user to pose queries and to manipulate documents based on hypertext topology to identify desired nodes based on graph connectivity.

Even with all these different techniques and strategies for making reading and annotating documents easier and more manageable, current techniques still either interrupt the reader's concentration or rely on the reader's ability to later locate the interesting links and remember why they were interesting.

Thus, there is a desire for a system which will allow a user to defer link following while not losing track of the links location within a document. Additionally, there is a desire for a system which extends beyond just explicit link gathering interfaces.

SUMMARY

The present invention provides readers with a mechanism that allows them to defer link following in a document by detecting the reader's interest in a particular external document through their freeform markings and annotations, and processing these detected marks in various ways. In general, two different kinds of processing are supported: (1) using the reader's marks on or near hypertext link anchors—annotated anchors—to define a collection of documents of interest from all possible external document references that the reader encounters; and (2) using these marks to help the reader visualize the interconnections of interest.

The invention, roughly described, comprises a system for detecting annotated anchors in a document. In one aspect, the invention includes a method for detecting a reader's annotations in a document and determining the presence of a document reference in the document proximate to the annotation. These document references are referred to herein as "anchors" and hence the system identifies "annotated anchors" in the document under consideration by the reader.

In a further aspect, the detection is accomplished by a method, which may be in the form of programming code, which groups annotation marks and determines whether a document reference is positioned in or near the annotations. The system detects both explicit anchors, such as hypertext links, and implicit anchors, such as bibliographic references or citations.

In another aspect, the annotated anchors detected are referenced in a data structure to allow for further processing of the annotated anchors. In an embodiment, the data structure may be hierarchical, spatial, sequential, etc.

An additional component of the system of the invention is the processing which may occur on the annotated anchors once detected. Such processing includes: generating a list illustrating the documents that are targets of annotated anchors, with or without the annotation metadata, to allow for deferred link following; constraining the list illustrating the target documents; searching a document database for documents containing one or more references to these target documents; pre-fetching documents from a document database; allowing propagation of the annotations to other anchors which reference the same target in the same document or in other documents and/or hypertext structures; and suppressing or enhancing links based on defined annotation structures. The list may be generated from any serializable structure, such as hierarchical, spatial, sequential, etc.

In another aspect, a method for detecting and processing annotated anchors in a document is provided. The method includes the steps of detecting an annotation in the document, detecting, proximate to or within the annotation, the presence of an anchor; and, processing the annotated anchor.

According to still another aspect, an apparatus for detecting and processing an annotated anchor in a document is provided. The apparatus includes a processor, and a processor readable storage medium in communication with the processor which contains processor readable program code. The processor readable program code programs the apparatus to detect an annotation in the document, and detect, proximate to or within the annotation, the presence of an anchor. In addition to detecting annotated anchors, the apparatus is also programmed to perform various processes on the annotated anchor.

BRIEF DESCRIPTION OF THE DRAWINGS

The invention will be described with respect to particular embodiments thereof. Other objects, features, and advantages of the invention will become apparent with reference to the specification and drawings in which:

FIG. 1 shows various examples of annotations which may be formed using conventional annotation techniques;

FIGS. 6A and 6B illustrate examples of output generated using the list process, according to an embodiment of the present invention;

DETAILED DESCRIPTION

Figure 2:
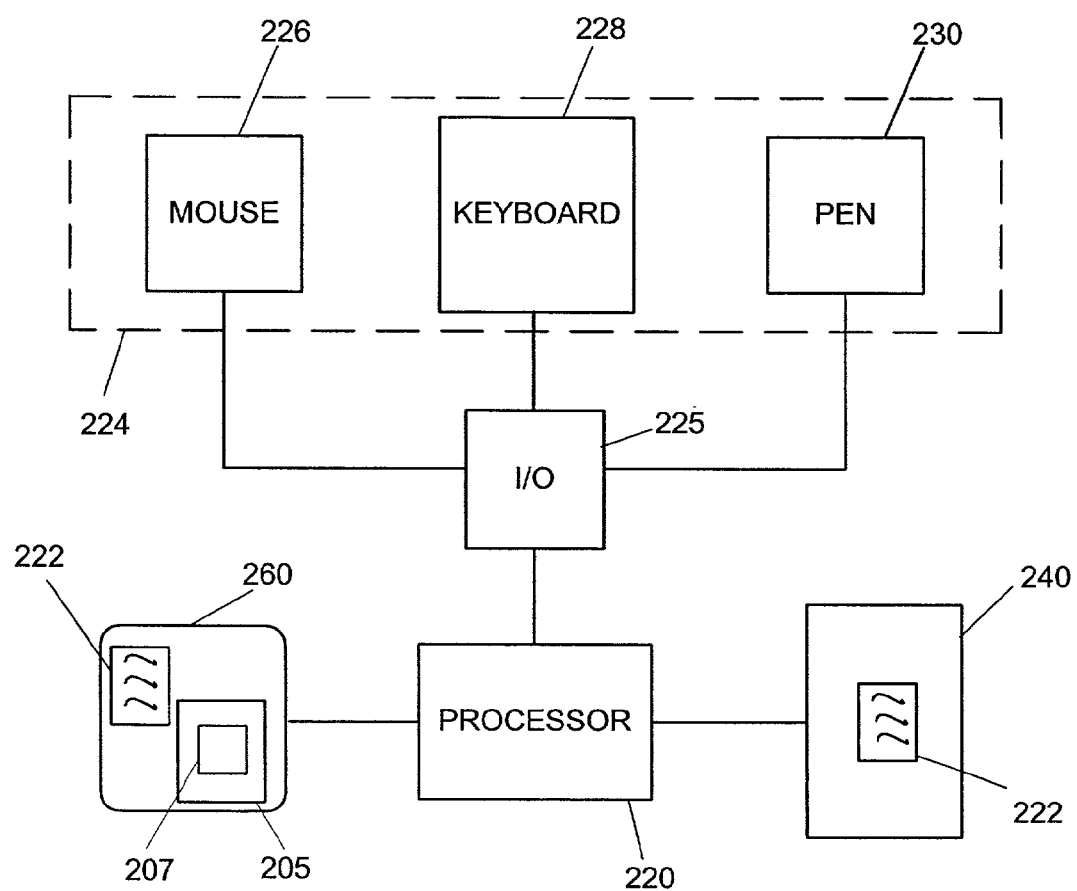
FIG. 2 is a block diagram of a hardware system suitable for implementing various embodiments of the present invention.

Embodiments of the present invention provide a system, method, and article of manufacture for detecting and processing annotated anchors within documents. The system may be applied in any number of physical contexts. For example, embodiments of the present invention may be implemented as their own application, or work within existing applications, such as Microsoft Word, Microsoft Internet Explorer, Netscape Navigator or any other document viewing application. Additionally, the system may be implemented to function with a single document or a collection of multiple documents.

A "document" as described herein, may be any representation of thoughts by means of conventional marks or symbols. For example, a document may be an electronic document, such as a .pdf, .doc, .wpd, .rtf, html, or any other type of similar electronic file. Additionally, a document maybe video, still image, or picture. In general, a document may be any graphical representation which is viewable by a reader.

"Annotation" as described herein, may be any freeform marking or indication which is associated (such as sequentially, logically, etc.) to at least portion of a document. An annotation may be positioned anywhere, irrespective of document structure, and may be generated with any type of marking, regardless of extent or type. For example, an annotation may be a pinpoint, circle, star, underline, highlight, square, doodle, written comments, or any other type of graphical representation.

An annotation maybe as simple as the placement of a single dot or point, as long as the reader is free to position the dot or point. While an annotation, such as a dot or point is viewable with the document, the annotation may be stored apart from the document with which the annotation is associated. Additionally, as described herein, an annotation is distinguishable from bookmarks, such as those used in Microsoft Reader®. Such bookmarks generally cannot be placed anywhere on a displayed document, nor can they be made with any type of marking.

An "anchor" as described herein, is any perceivable manifestation of a link or reference to another document or to another portion of the current document. An anchor may be explicit, such as a hyperlink in a web page, or it may be implicitly defined, such as by the grammar one uses to identify documents in certain forms or citations. For example, "http://www.ibm.com/sfasp/" 603 illustrated in FIG. 6A, is an example of an explicit anchor. Alternatively, "Chandler v. Miller" (FIG. 6B), which is a reference to another document, is an example of an implicit anchor.

As described herein, annotating an anchor is distinguishable from selecting an anchor. Readers select an anchor explicitly to perform an action at that particular moment, such as accessing a related document or location. Annotating an anchor is part of a delayed engagement with the target document. By annotating an anchor a reader can continue reading the document without having to access the related document or location at that particular moment.

Figure 1:
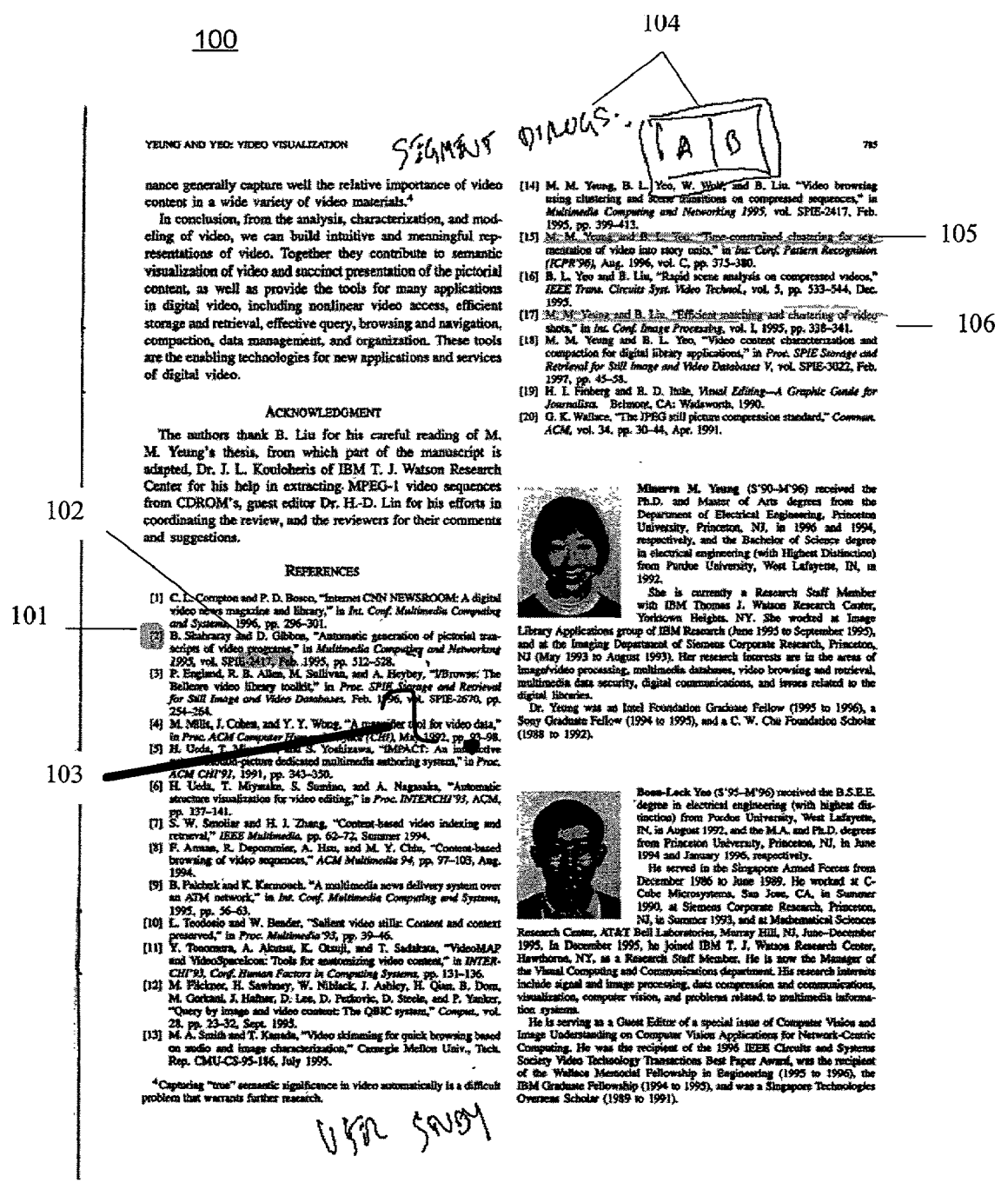

FIG. 1 represents various examples of annotations 100–106 which may be generated by a reader on document 100 using any conventional annotation technique. For example, annotations 101, 102, 105, and 106 are generated by a reader digitally highlighting a portion of document 100. Annotations 103, and 104 are generated by a reader marking on document 100 using any pointing device which is capable of accessing any portion of document 100. In general, an annotation may be made using any document annotation technique.

FIG. 2 illustrates a computing device architecture 200 suitable for implementing various embodiments of the present invention. The computing device architecture 200 includes a processor 220 communicating with a display 240, a storage device 260, and an input/output interface 225. The storage device 260 stores a document 222 which is displayable on display 240. The input/output interface 225 communicates with any number of conventional input/output devices 224 such as a mouse 226, a keyboard 228 and/or a pen-based device 230. A reader manipulates the input/output devices 224 to annotate the document 222 while it is displayed on display 240. The computing device 200 then stores these annotations in either storage device 260 or a different storage device (not shown).

As shown in FIG. 2, computing device architecture 200 may be implemented using a programmed general purpose computer. However, computing device 200 may also be implemented using a special purpose computer, laptop computer, any paper user interface coupled to an entertainment context, (i.e. video), a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA, PAL, or the like. In general, any device on which a finite state machine capable of implementing embodiments of the present invention can be used to implement the computing device architecture 200.

Additionally, as shown in FIG. 2, memory 260 may be an article of manufacture, such as a computer readable medium. For example, memory 260 may be a magnetic hard disk, an optical disk, a floppy disk, CD-ROM (Compact Disk Read-Only memory), RAM (Random Access Memory), ROM (Read-Only Memory), or any other readable or writeable data storage technology, singly or in combination.

Memory 260 may include an operating system 205, such as Microsoft Windows® or Unix®, wherein the operating system 205 is capable of executing programs or applications using the computing device architecture 200. An embodiment of the present invention is implemented as a software program 207, and is stored on memory 260. In an embodiment, software program 207 can be implemented to function as its own application or may be implemented to function within an existing application, such as Microsoft's Internet Explorer, Netscape Navigator, Microsoft Word, or any other type of document viewing application. Additionally, embodiments of the present invention may be implemented to function with any type of language, such as English, Japanese, Spanish, etc.

As will be understood, embodiments of the present invention, such as software program 207, may be in the form of a software program, a software object, a software function, a software subroutine, a software method, a software instance, a code fragment, a hardware operation or user operation, singly or in combination. It is understood that software program 207 can be implemented using any programming code, such as C, C++, FORTRAN, Visual Basic, Java, etc. Additionally, software program 207 may be implemented using one, two, or any number of computing devices 200.

Furthermore, it should be appreciated that the link 270 connecting the memory 260 and the processor 200 can be a wired or wireless link to a network (not shown). The network can be a local area network, a wide area network, an Intranet, the Internet or any other distributed processing and storage network.

Figure 3:
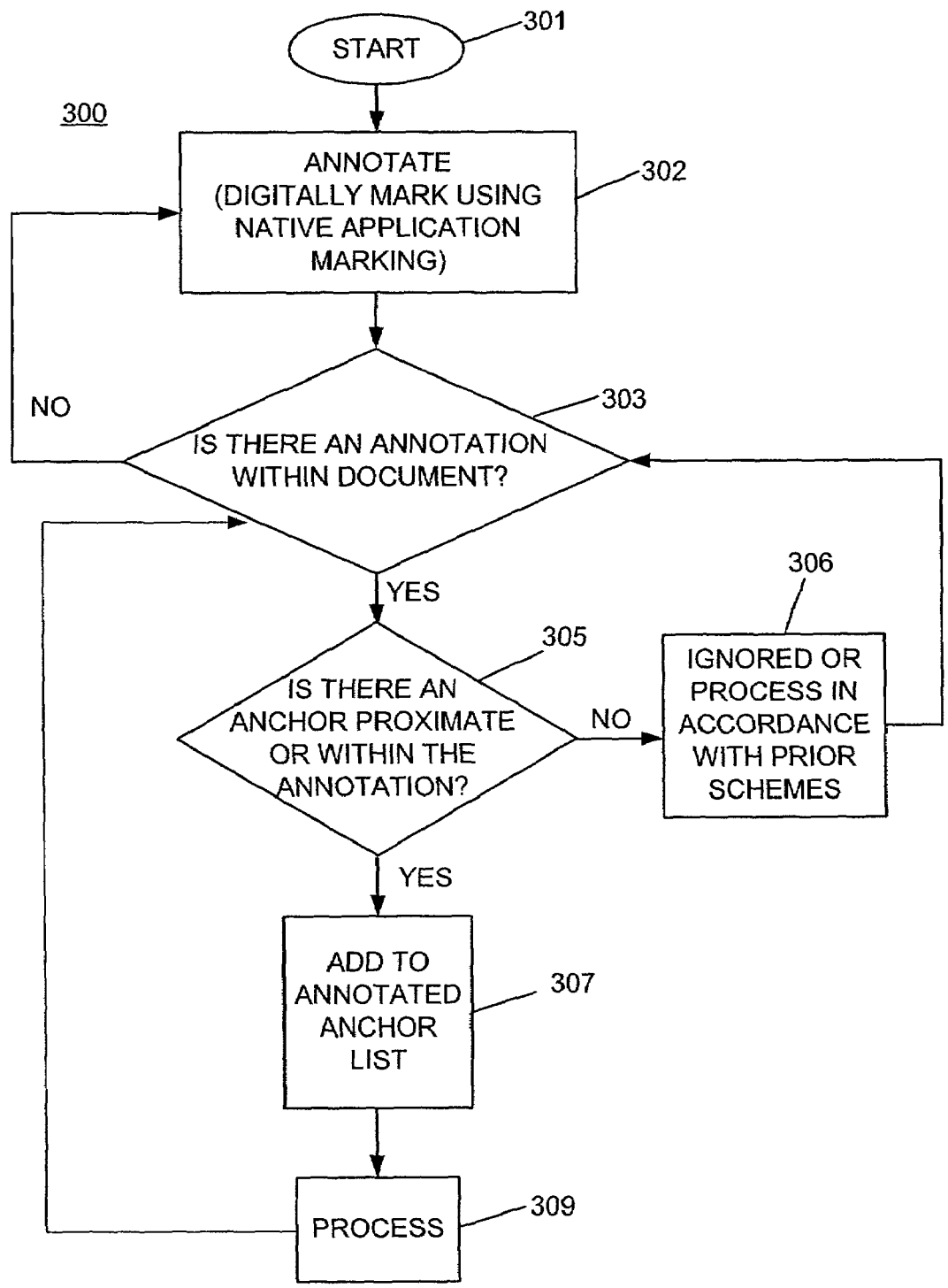
FIG. 3 is a flowchart outlining a method for detecting and processing an annotated anchor, according to an embodiment of the present invention.

FIG. 3 is a flowchart outlining a method for detecting an annotated anchor within a document, according to an embodiment of the present invention. As one who is skilled in the art will appreciate, FIGS. 3, 5, 7–10, 12, 13, and 16 illustrate logic boxes for performing specific functions. In an alternate embodiment, more or fewer logic boxes may be used. In an embodiment of the present invention, a logic box may represent a portion of software program 107 illustrated in FIG. 2, or any portion of embodiments of the present invention.

The method begins at logic box 301, where the system receives a document. In logic box 302 a reader begins annotating the document. Annotations can be made within a document using any currently available document annotation technique. As a reader is reading the document and making annotations, control is passed to logic box 303.

In logic box 303 the system determines whether there is an annotation within the document. If it is determined that there is no annotation within the document control is returned to logic box 302 and the process is repeated until the document is removed or an annotation is made. If however, it is determined in logic box 303 that an annotation has been made, control is passed to logic box 305.

In logic box 305 it is determined whether an anchor is proximate or within the annotation. If it is determined in logic box 305 that there are no anchors proximate or within the annotation, control is passed to logic box 306, and the annotation is ignored in the process, or manipulated according to other current annotation processing schemes. Once the annotation has been ignored or otherwise processed, control is returned to logic box 303 and the process is repeated.

If however, it is determined in logic box 305 that there is an anchor proximate or within the annotation, control is passed to logic box 307 and the anchor located in logic box 305 is added to a list of annotated anchors and control is passed to logic box 309.

In logic box 309 the list of annotated anchors generated in logic box 307 is processed. The list may be processed using any of the processing techniques illustrated in FIG. 4 and described below, singly or in combination. Once the desired processing has been performed in logic box 309, control is returned to logic box 303 and the logic boxes are repeated until the document is removed or all annotations have been processed.

In an embodiment, other techniques for modifying or managing annotations may be performed prior, subsequent to, or during the process 300. For example, in an embodiment, annotations made in logic box 302 may be modified according to the techniques described in U.S. Pat. No. 5,889,523 titled "Method and Apparatus for Dynamically Grouping a Plurality of Graphic Objects," which is herein incorporated by reference, which group a plurality of objects, or annotations, based on time and space. Additional techniques for grouping and modifying annotations may include adding to an annotation made by a reader the remainder of a sentence, or paragraph, if a portion of the sentence or paragraph was not originally annotated.

In such an example, modifications may be made prior to the processing of logic boxes 303–309, and logic boxes 303–309, described above, will be processed using the modified annotations.

Additionally, in an embodiment logic boxes may be removed from the process illustrated in FIG. 3. For example, the process may be performed without adding the annotated anchor to an annotated anchor list 307. In such an embodiment, once an annotated anchor is determined in logic box 305, control is passed to logic box 309 and the anchor is processed according to any of the processing techniques described below.

Figure 4:
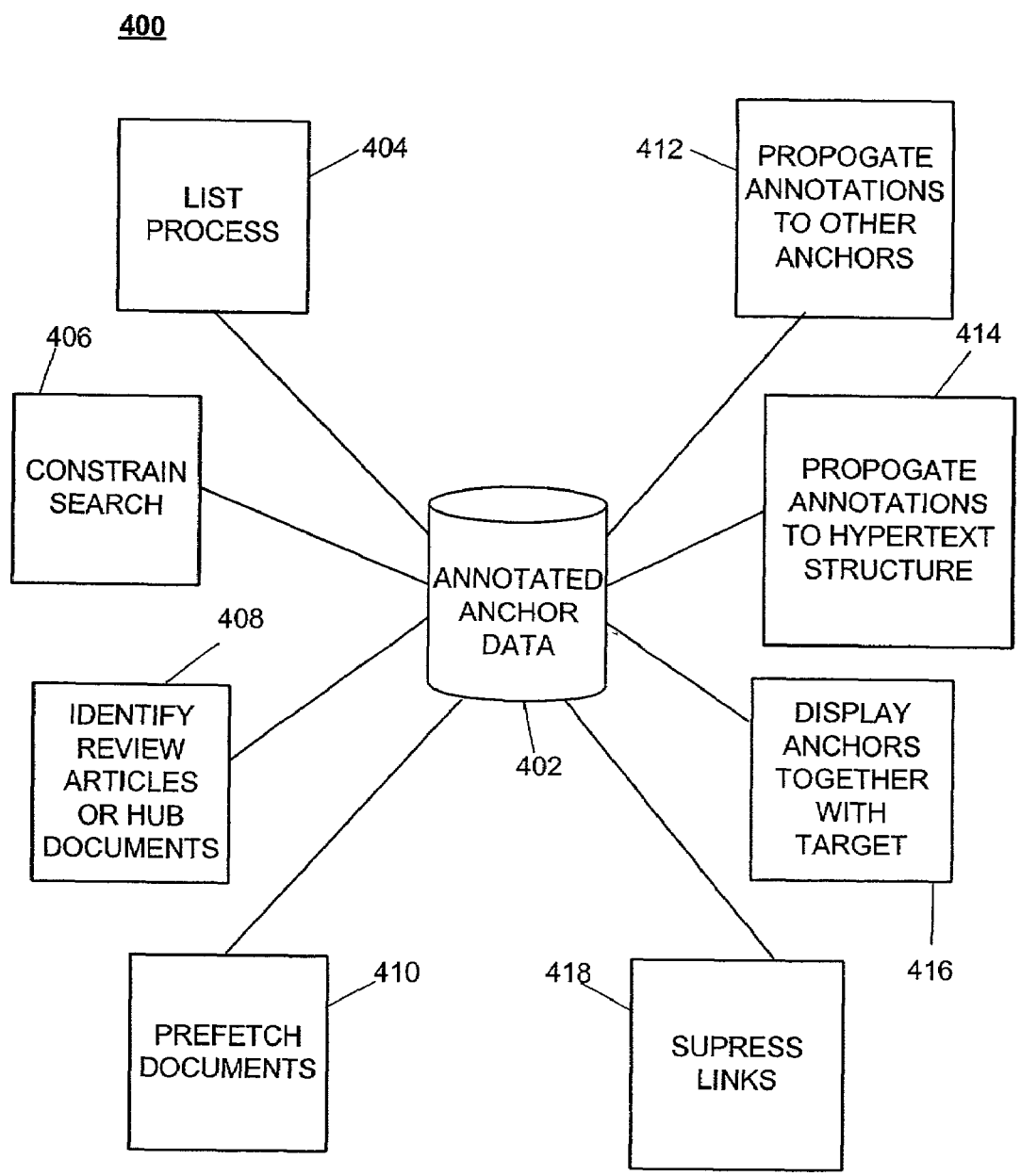
FIG. 4 is a block diagram illustrating examples of various processing one might perform on the data retrieved and stored in accordance with embodiments of the present invention.

FIG. 4 illustrates the different processes which may be performed on the list of annotated anchors generated using the process described with respect to FIG. 3, according to an embodiment of the present invention. Annotated anchor data 402 relates to the list of annotated anchors generated in logic box 307 during the process 300 (FIG. 3). It will be understood that the processes illustrated in FIG. 4 may be performed on the list of annotated anchors 402 or alternatively may be performed on each annotation as it is made in a document.

Once a reader has finished reading and annotating a document they may wish to follow the links which were annotated during their reading. Accordingly, the list process 404 will be performed on the annotated anchor data 402 to generate a "to-read" list. List process 404 allows a reader to read a document, annotate any portion of the document using existing annotation techniques, and later review a list of only annotations containing anchors. The system provides a reader with the ability to keep track of anchors which they find interesting, without interrupting reading. The user can annotate on or around the anchor, and defer the accessing of the related document until a later time.

Figure 5:
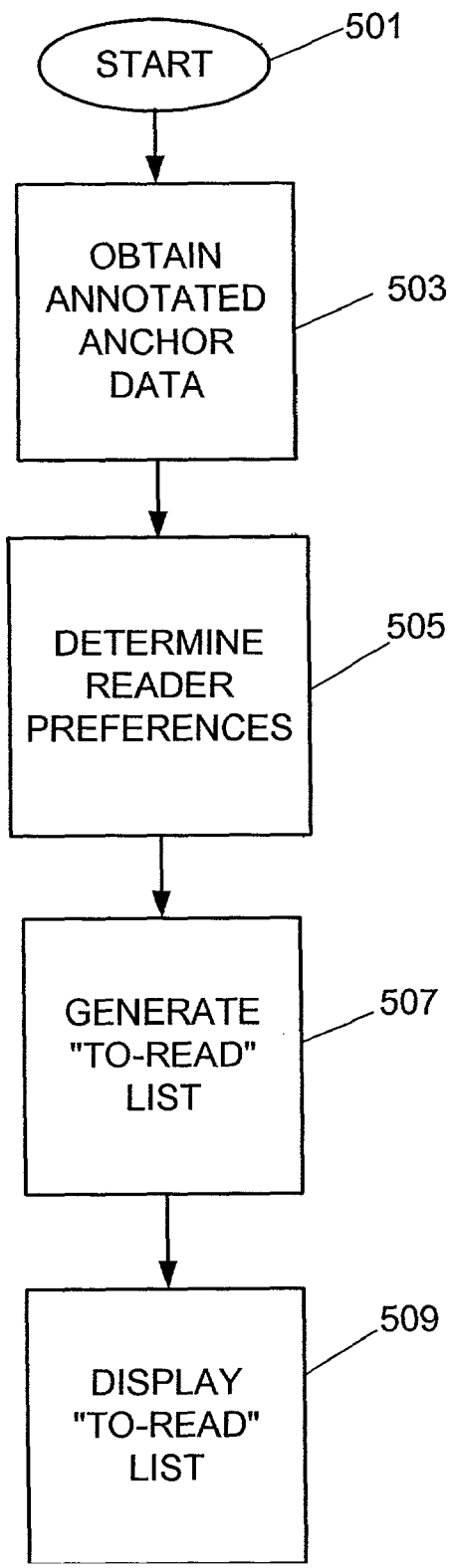
FIG. 5 is a flowchart outlining the list process, according to an embodiment of the present invention.

FIG. 5 illustrates a flowchart outlining the list process 404 illustrated in FIG. 4. Upon initiation of the process in logic box 501, control is passed to logic box 503 where the system obtains annotated anchor data 402.

In logic box 505 the system determines the readers preferences for displaying the annotated anchor data 402. For example, the user may desire to organize the list based on metadata of the target documents (such as the target document's title, author, size, when created, etc.), metadata of the annotations (such as the location of the annotations within the present document, when the annotations were made, the color, shape, size of the annotations, etc.), metadata of the annotated anchor (such as the link it represents, its location in the document, etc.), or any other desired organizational technique. Additionally, a reader may desire to view the entire annotation which contains each anchor, just the first annotation containing each anchor, just the anchors themselves, or any other display format selected by the reader.

In logic box 507 a "to-read" list is generated from the annotated anchor data 402 based on the readers preferences obtained in logic box 505. Upon generation of a "to-read" list, control is passed to logic box 509 and the "to-read" list is displayed on display 240 (FIG. 2).

FIGS. 6A and 6B illustrate examples of "to-read" lists 600, 650 generated from the anchor data 402 using the list process 404, according to an embodiment of the present invention. The lists 600, 650 may be generated from one, two, or as many documents as selected by the reader.

FIG. 6A includes anchors 601, 603, 605, 607, annotations 609, 611, 613, 615, 617, 617 and some surrounding context 621, 623, 625, 627, 629 to make the anchors more comprehensible.

The list may be formatted according to any user created attributes and may include annotations from one, two, or as many documents as desired. For example, list 600 is formatted based on the order in which the annotated anchors 601–607 first appear in the document titled "Yeung et al., 1998." Additionally, a reader may select to group annotations containing anchors which point to the same target. For example, in FIG. 6A annotations 609 and 611 both include an anchor which points to the same target document. Thus, annotations 609 and 611 may be grouped and listed under the same anchor 601.

FIG. 6B illustrates another "to-read" list 650 of annotated anchors generated using the list process 404 illustrated in FIG. 5, according to an embodiment of the present invention. The list 650 is formatted first by target documents of the annotated anchors and ordered by frequency of annotations. In this example, the target document which has corresponding anchors most frequently annotated is *Vernonia v. Action*, Supreme Ct., June 1995 651. The next most frequently annotated target document is *Skinner v. Railway Labor Executives' Assoc.*, Sup. Ct, March 1989 652. Included under each target document heading 651, 652 is the document from which the annotation is located 653, 655, 657, the annotated anchor which points to the target document 659, 661, 663, and surrounding context 665, 667, 669.

Each of the to-read lists 600, 650, or any other to-read list generated according to the process illustrated in FIG. 5, provides a reader access to the linked document, access to the context of the annotation, as well as access to the document in which the annotation was made. A reader can select a target in the list to follow the link, or select the annotation to return to that portion of the document.

The annotated anchor data 402 may also be treated as a collection, and content and/or metadata searches of the collection may be performed according to an embodiment of the present invention. For example, a reader may select the constraint search process 406 and have the system display only annotations which were made using a particular color, such as yellow, annotations of a particular shape, such as a circle, or any other user-defined criteria.

Additionally, if a reader wishes to determine the meaning of a technical term used within the document they are currently reading, the constraint search process 406 will search the target documents which the annotated anchors point to and provide an overview of how the term is used in these documents. This overview may be displayed in a format similar to that shown in FIGS. 6A and 6B. Alternatively, the results may be ranked or filtered by the number of annotated anchors for each returned document, the types of annotations on the anchors, the type of the link that was annotated, etc.

Figure 7:
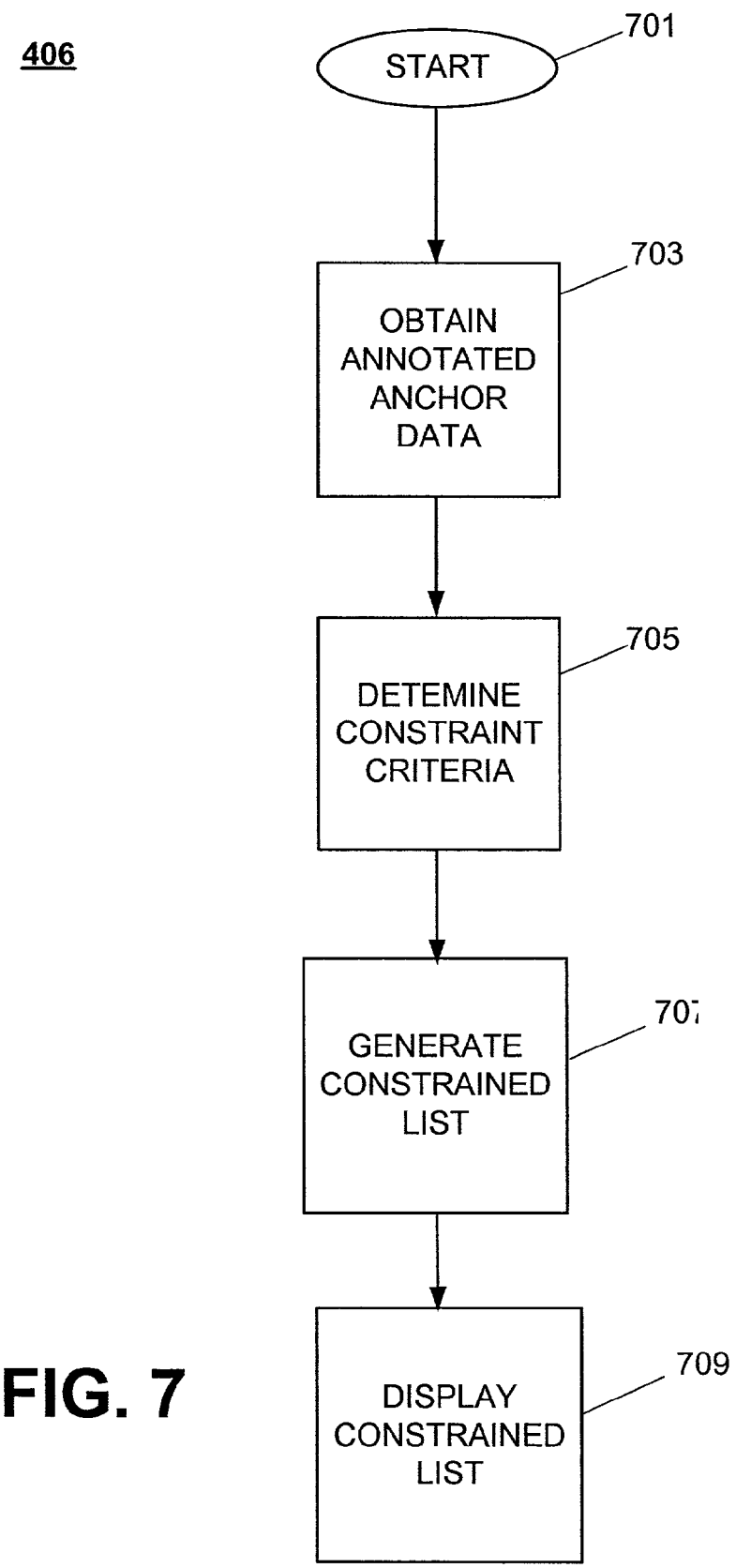
FIG. 7 is a flowchart outlining the process of constrain searching, according to an embodiment of the present invention.

FIG. 7 illustrates a flowchart outlining the process of constrain searching 406 of FIG. 4. The process begins at logic box 701 and control is passed to logic box 703 where the system obtains annotated anchor data 402.

In logic box 705 the system determines the constraint criteria selected by a reader. For example, the constraint criteria may be the color or shape of an anchor, or searching the target documents for a particular term.

In logic box 707 the system searches for all information which meets the constraint criteria and generates a constrained list. Upon generation of the constrained list control is passed to logic box 709 and the list is displayed on display 240 (FIG. 2).

The process illustrated as block 408 in FIG. 4, provides a reader with the ability to search for "hubs" that cite many target documents which are referenced by an annotated anchor. For example, if a researcher has collected a dozen references of interest, and would rather read an article reviewing those documents than read the dozen papers, the researcher can locate a hub document that cites some or all of the other documents. Additionally, an embodiment of the present invention can provide an interface for refining such searches, for example by marking individual documents in the list as being more or less important.

Figure 8:
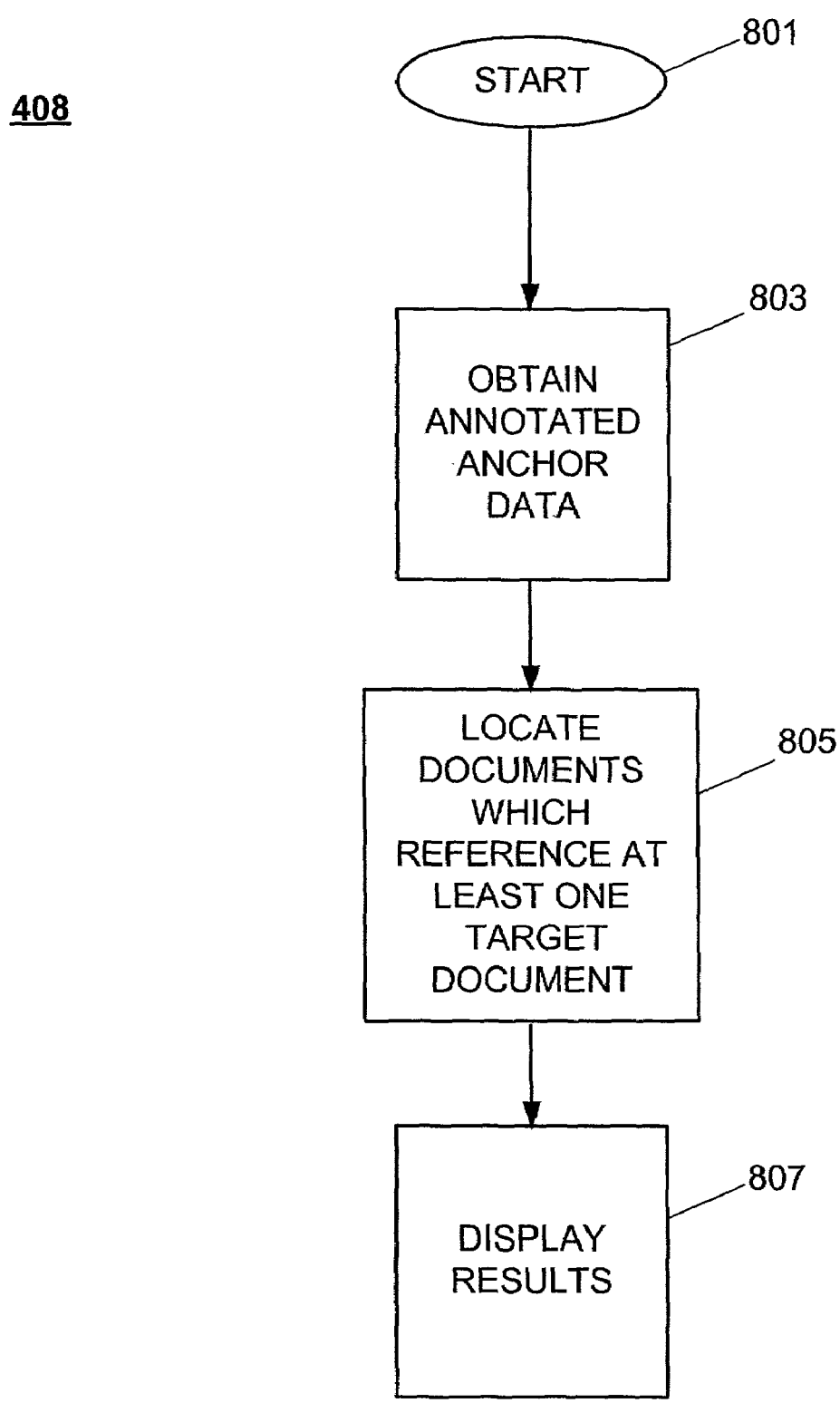
FIG. 8 is a flowchart outlining the process of identifying review articles or hub documents, according to an embodiment of the present invention.

FIG. 8 illustrates a flowchart outlining the process of identifying review articles or hub documents 408 of FIG. 4. The process begins at logic box 801 and control is passed to logic box 803 where the system obtains annotated anchor data 402.

In logic box 805 the system locates a document or documents which reference at least one target document identified in annotated anchor data 402. The system may search a predefined list of documents for a reference, or alternatively the system may search for any document which contains references to multiple target documents. Once a list of search results has been generated, control is passed to logic box 807 and the system displays the results of the search performed in logic box 805 on display 240 (FIG. 2). In an embodiment, the results may be displayed in a format similar to that illustrated in FIGS. 6A and 6B, or in any other reader-selected format.

The process of pre-fetching documents 410 provides additional functionality and portability to embodiments of the present invention. This technique is often useful when the system is implemented using a device which may not have constant access to target documents. Such devices may be laptops, Palm tops, or other mobile computing devices.

The process of pre-fetching 410 obtains target documents of annotated anchors prior to the time the reader actually attempts to access the document.

Current techniques for pre-fetching documents obtain all of the documents referenced by the document being viewed. This is often undesirable because there may be many referenced documents and to pre-fetch all of them would be expensive, and both time and space consuming. An example of such as system is described in CiteSeer (Giles et al., 1998) which runs searches over the Web to identify articles corresponding to references in academic papers. The CiteSeer system retrieves each of these articles and builds an article reference database.

Figure 9:
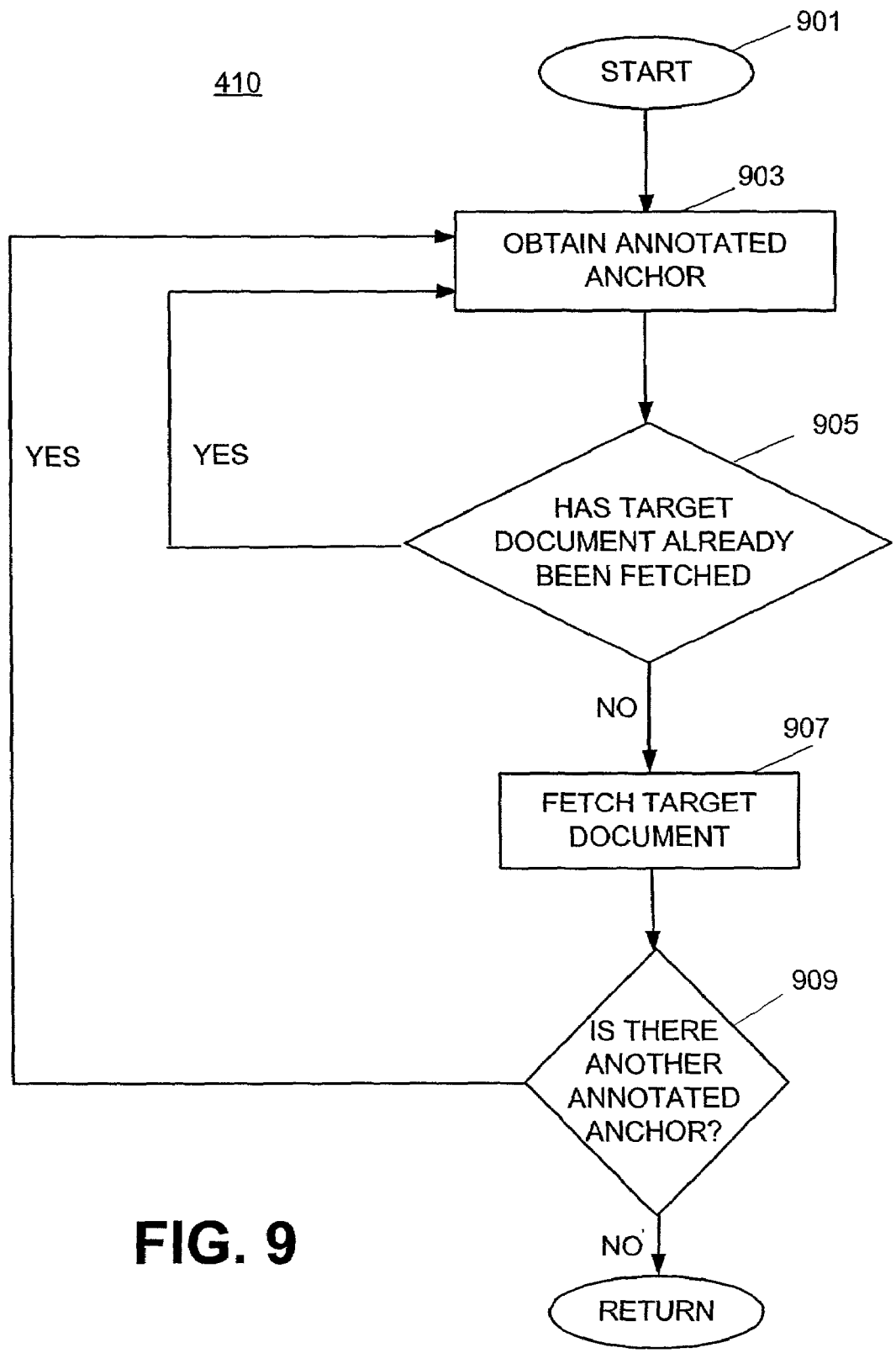
FIG. 9 is a flowchart outlining the process of pre-fetching documents, according to an embodiment of the present invention.

FIG. 9 illustrates a flowchart outlining the process of pre-fetching documents 410 of FIG. 4, according to an embodiment of the present invention. The process begins at logic box 901 and control is passed to logic box 903 where the system obtains an annotated anchor. The annotated anchor may be obtained as soon as the reader performs the annotation or alternatively from annotated anchor data 402.

In logic box 905 the system determines whether the target document has already been pre-fetched or already contained in memory. If it is determined in logic box 905 that the system already has the target document, control is returned to logic box 903 and the process continues until all annotated anchors have been processed. If however, it is determined that the target document has not been pre-fetched, control is passed to logic box 907.

In logic box 907 the system fetches the target document and stores it in memory 260 (FIG. 1) or another memory location which will later be accessible. Once the target document has been fetched, control is passed to logic box 909 and the system determines whether there is another annotated anchor within the document. If it is determined that there is another annotated anchor, control is returned to logic box 903 and the process is repeated for that annotated anchor. If, however, it is determined in logic box 909 that there are no other annotated anchors, control is returned to logic box 309 of FIG. 3.

In addition to using annotated anchors to generate a "to-read" list, and to gather/organize and pre-fetch documents, the process of propagating annotations to other anchors 412 illustrated in FIG. 4 may be implemented according to an embodiment of the present invention. Propagating annotations to other anchors helps a reader visualize interconnections of interest, or alternatively to suppress undesired links. Visualizing interconnections provides a reader with advanced notice as to whether they found an anchor interesting. The technique of propagating anchors provides a trail marking facility which reduces the disorientation that often accompanies densely anchored documents. By propagating annotations of anchors to other anchors which point to the same target, a reader can determine whether an anchor points to a target whose anchor has already been annotated. This is often beneficial when several different anchors reference the same target.

Additionally, when a reader sees an annotation which has been propagated to a subsequent anchor, the reader can select the annotation and the system will display the original annotated anchor or anchors (if the anchor has been annotated more than once). Providing this additional information allows a reader to select between viewing more context for a specific anchor, navigating to the full context of the annotated anchor, navigating to the target of the anchor, or returning to reading the original document.

Figure 10:
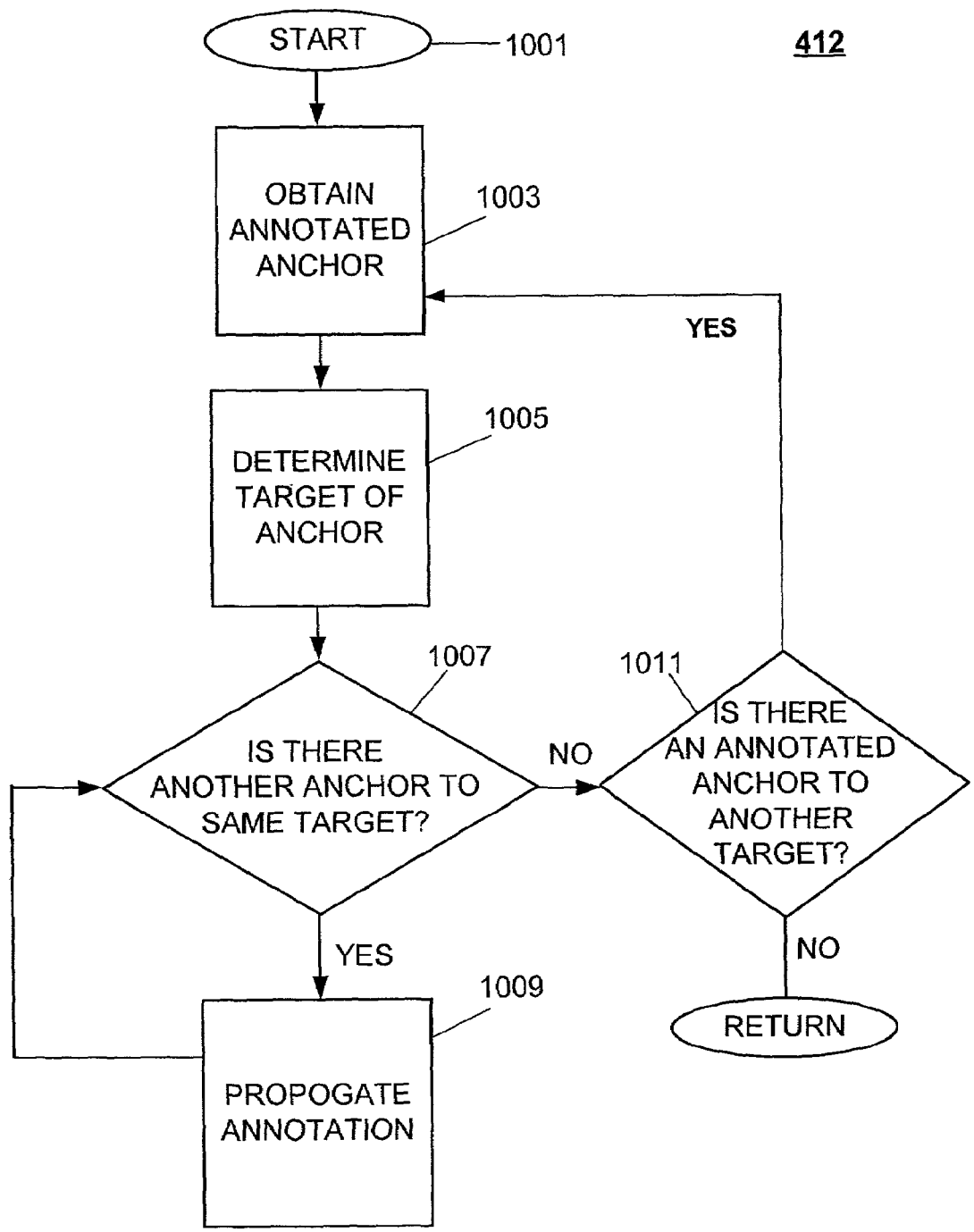
FIG. 10 is a flowchart outlining the process of propagating annotated anchors, according to an embodiment of the present invention.

FIG. 10 illustrates a flowchart outlining the process of propagating annotations to other anchors 412 of FIG. 4, according to an embodiment of the present invention. The process begins at logic box 1001 and control is passed to logic box 1003 where the system obtains an annotated anchor. The annotated anchor may be obtained as soon as the reader performs the annotation or alternatively, from annotated anchor data 402.

In logic box 1005 the system determines the target of the annotated anchor. The target may be another document or another location in the same document. Once the target is determined, control is passed to logic box 1007 and a determination is made as to whether there is another anchor which points to the same target. The system may search for other anchors within the same document, or for anchors in any document which may be accessed by the reader. Additionally, as new documents are accessed by a reader, the system may scan those documents to determine if anchors exist within the document and if the anchors point to a target with an already-annotated anchor. If it is determined in logic box 1007 that there are other anchors which point to the same target as the annotated anchor, control is passed to logic box 1009. If however, it is determined in logic box 1007 that there are no other anchors which point to the same target as the annotated anchor, control is passed to logic box 1011.

In logic box 1009 the anchor located in logic box 1007 is annotated with an annotation similar to the annotation made by the reader on the original anchor. For example, if a user circles an anchor, and another anchor which points to the same target is located, the system will circle the newly-found anchor.

In logic box 1011 it is determined whether there is an annotated anchor which represents a different target. If an annotated anchor to another target exists, control is returned to logic box 1003 and the process is repeated. However, if no other annotated anchors exist, control is returned to logic box 309 of FIG. 3.

Figure 11:
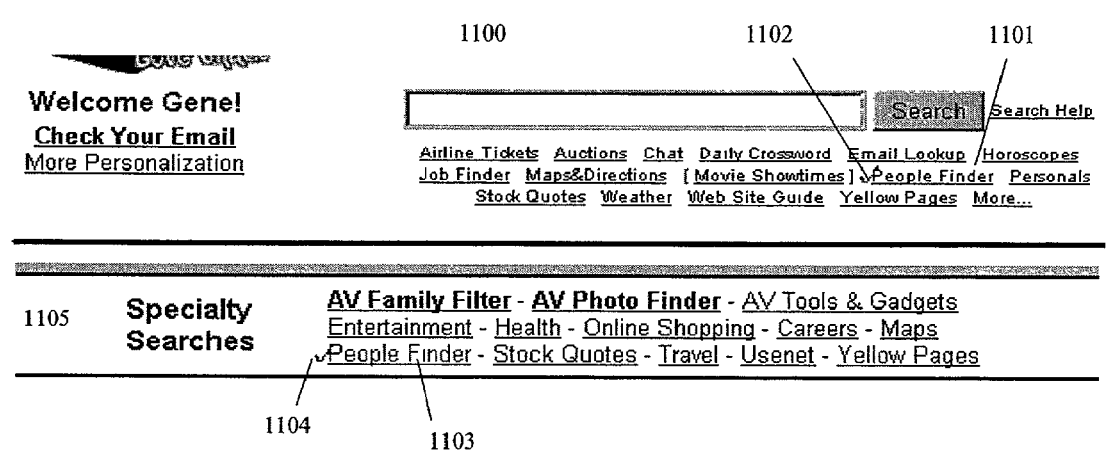
FIG. 11 illustrates an example of an output from the process of propagating annotated anchors, according to an embodiment of the present invention.

FIG. 11 illustrates a snippet of two web pages 1100 and 1105, illustrating an example of an output resulting from the process of propagating annotations 412, illustrated in FIG. 10, according to an embodiment of the present invention. This technique propagates annotation 1102, made by a reader on or around anchor 1101, to other anchors 1103 which reference the same target. In an embodiment, once an anchor has been annotated in one document, the annotation can be propagated to all other anchors pointing to the same target. These anchors may be in the same document or in other documents which the reader may access. For example, referring to FIG. 11, if a reader annotates the anchor "People Finder" 1101 with a check annotation 1102, all other instances of an anchor which points to the same target will receive a similar annotation. Thus, "People Finder" 1103 located in document 1105 is updated with a similar check annotation 1104. By updating anchors which point to the same target as an annotated anchor the reader will know that each of those anchors point to the same target.

In addition to propagating annotations to other anchors which reference the same target, a reader may also select the process of link suppression 418 (FIG. 4) and have all anchors relating to an annotated anchor suppressed. For example, when a reader approaches a densely-linked document with a particular information need, the reader may wish to suppress some links that are not relevant to the current situation. If the reader crosses out an anchor to an unwanted link, the system can subsequently suppress all anchors which point to the same target, thereby reducing visual clutter and eliminating the distraction of deciding whether or not to follow, or annotate such links.

Figure 12:
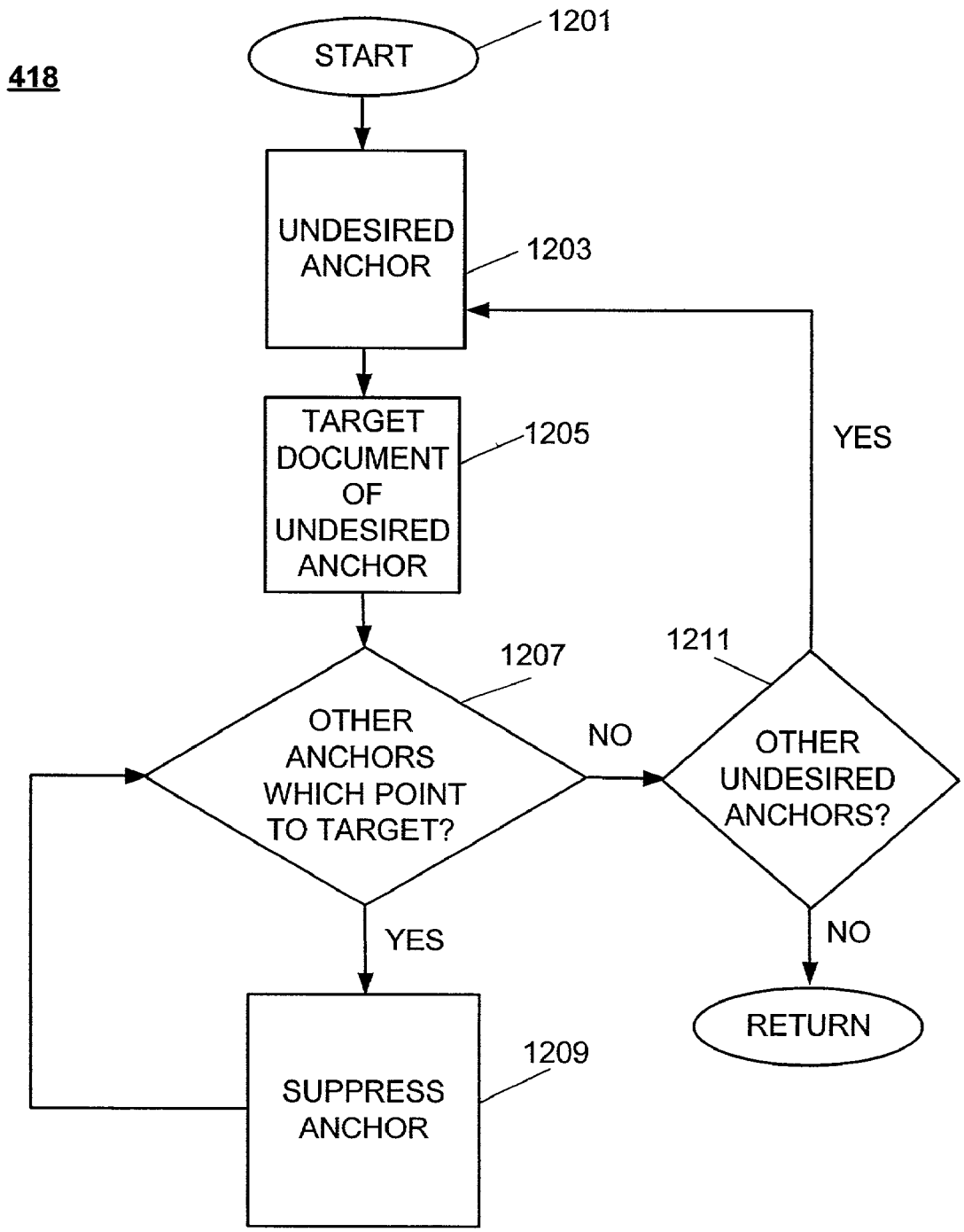
FIG. 12 is a flowchart outlining the process of link suppression, according to an embodiment of the present invention.

The process of link suppression 418 illustrated in FIG. 12 functions in a similar manner to the process of propagating annotations to other anchors 412, illustrated in FIG. 10.

FIG. 12 illustrates a flowchart outlining the process of link suppression 418 of FIG. 4, according to an embodiment of the present invention. The process begins at logic box 1201 and control is passed to logic box 1203 where the system obtains an indication from a reader that a anchor is undesired, or uninteresting. The indication may be made by the reader marking an anchor in a particular manner to designate that it is not interesting. Such marking may be in the form of striking out the anchor, marking an X on the anchor, or any other reader selected marking. It will be appreciated that a reader may make a marking on an anchor contained in a document, on an anchor which is being displayed as a result of any of the above-described processes, or on any other anchor which is viewable by the reader.

Once a marked anchor has been received, control is passed to logic box 1205 where the system determines the target of the marked anchor. Once the target is determined, control is passed to logic box 1207.

In logic box 1207 a determination is made as to whether there is another anchor which points to the same target. The system may search for other anchors within the same document, or for anchors in any document which may be accessed by the reader. Additionally, as new documents are accessed, the system may scan those documents to determine if any anchors pointing to the target exist within the document. If it is determined in logic box 1207 that there are other anchors which point to the same target as the marked anchor, control is passed to logic box 1209.

In logic box 1209 the anchor located in logic box 1207 is suppressed using a reader selected suppression technique. For example, a reader may desire to have all anchors which relate to an uninteresting target grayed out, presented in a format matching the other existing text, or in any other desired fashion. Once the anchor located in logic box 1207 has been suppressed, control is returned to logic box 1207 and the process is repeated.

If however, it is determined in logic box 1207 that there are no other anchors which point to the same target as the annotated anchor, control is passed to logic box 1211 and the system determines whether there are any other anchors which have been marked by a reader to indicate that they are undesirable. If it is determined that there are other undesired anchors, control is returned to logic box 1205 and the process is repeated for each additional undesired anchor. If, however, there are no other undesired anchors, control is returned to logic box 309 of FIG. 3.

Annotations of anchors may also be propagated onto visualizations of hypertext structures using the process of propagating annotations to hypertext structures 414, illustrated in FIG. 4. Generating and displaying hypertext structures which represent a group of documents and their interconnections is well known in the art and will not be described in detail.

Figure 14:
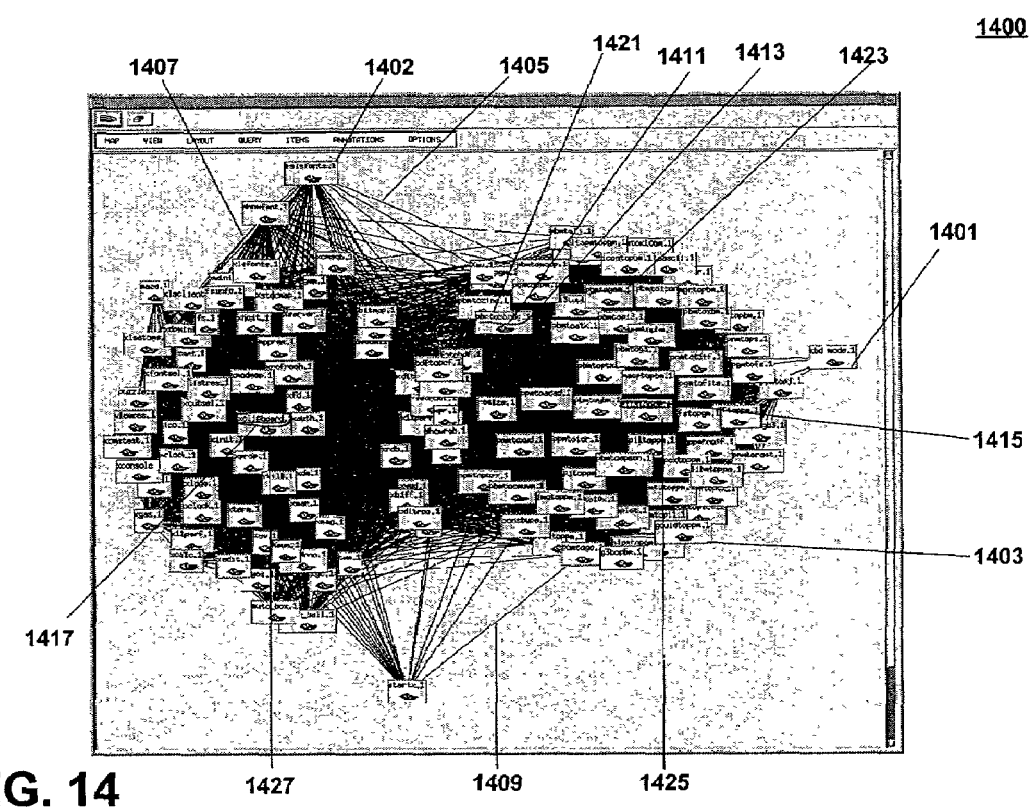
FIGS. 14–15 illustrate examples of output resulting from the process of propagating annotations to hypertext structures, according to an embodiment of the present invention.
Figure 15:
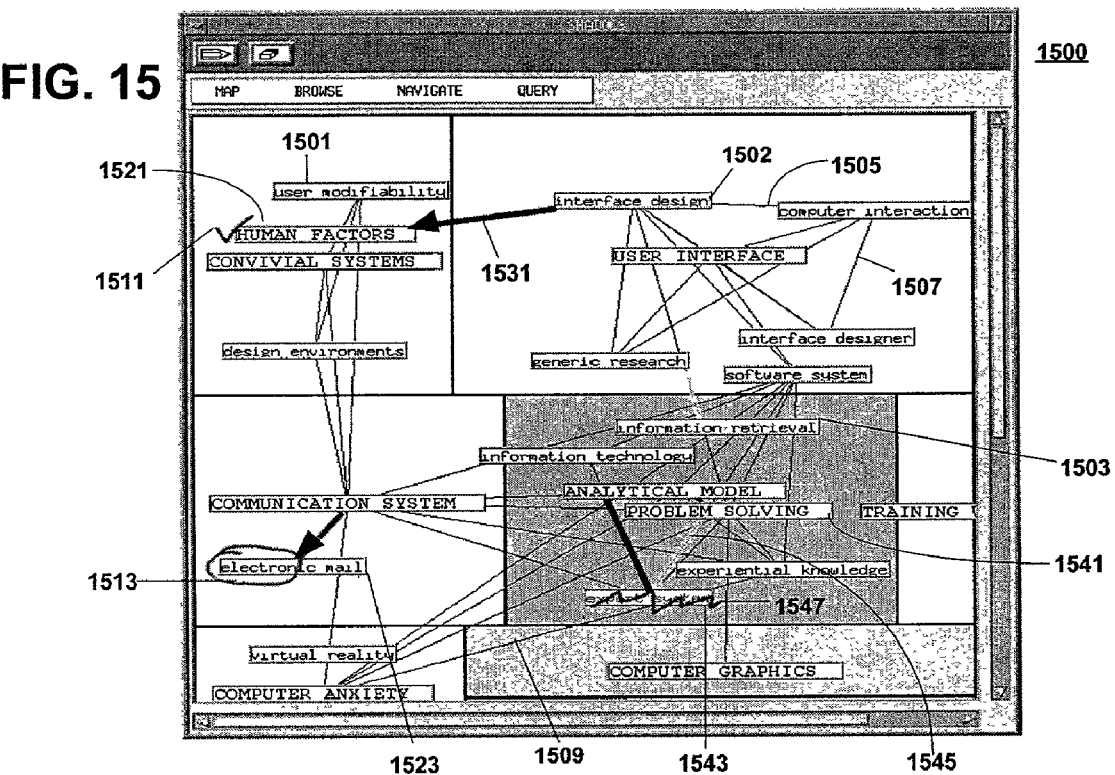

Hypertext structures illustrating a large number of documents with a large number of interconnections are often very dense and difficult to understand. The process of propagating annotations to hypertext structures 414, described with respect to FIG. 13 makes these structures more distinctive and easier for a reader to understand, as illustrated in FIGS. 14 and 15.

Figure 13:
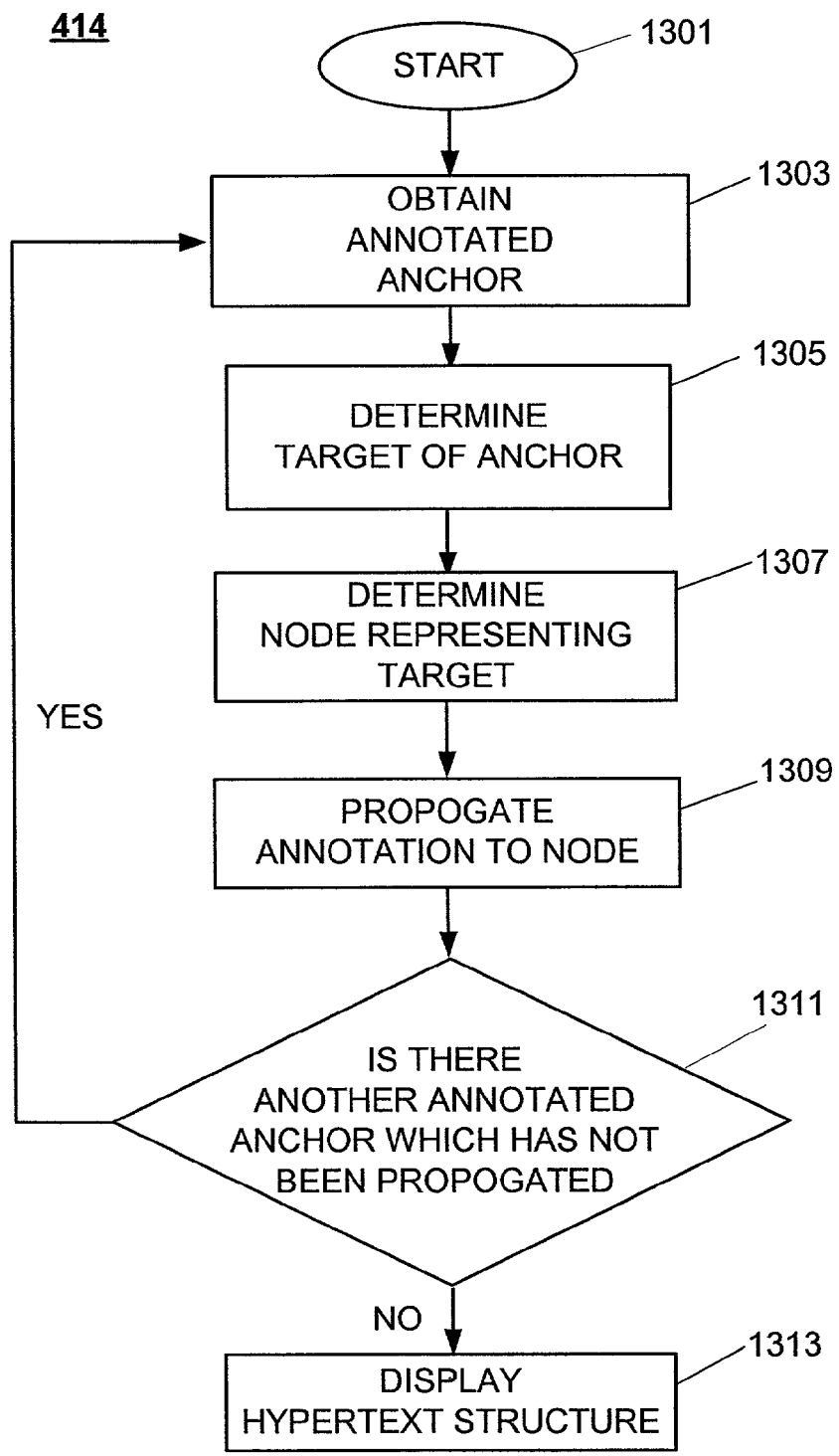
FIG. 13 is a flow chart outlining the process of propagating annotations to hypertext structures, according to an embodiment of the present invention.

FIG. 13 illustrates a flowchart outlining the process of propagating annotations to hypertext structures 414 of FIG.

4, according to an embodiment of the present invention. The process begins at logic box 1301 and control is passed to logic box 1303 where the system obtains an annotated anchor.

In logic box 1305 the system determines the target of the annotation and in logic box 1307 the system determines a node on a hypertext structure which represents the target document. In logic box 1309 the node located in logic box 1307 is annotated with an annotation similar to the annotation made by the reader on the original anchor. For example, if a user annotates an anchor with a circle, a circle will be propagated onto a node which represents the target of the circled anchor.

In logic box 1311 the system determines whether there is another annotated anchor which has not been propagated. If it is determined that there are other annotated anchors, control is returned to logic box 1303 and the process is repeated. If however, it is determined that there are no other annotated anchors, control is passed to logic box 1313 and the hypertext structure with the propagated annotations is displayed on display 240 (FIG. 2).

FIGS. 14 and 15 illustrate examples of an output resulting from the process of propagating annotations to hypertext structures 414 illustrated in FIG. 13, according to an embodiment of the present invention.

In FIG. 14 each node in the hypertext structure 1400, such as nodes 1401, 1402, and 1403 represent a document. The lines interconnecting each node, such as lines 1405, 1407, and 1409 represent a link, either unidirectional or bi-directional, between documents. Annotations 1411, 1413, 1415, and 1417 illustrate annotations which have been propagated to a node 1421, 1423, 1425, 1427 using the process of propagating annotations to hypertext structures 414 illustrated in FIG. 13. Each annotation 1411–1417 represents an annotation made by a reader on an anchor, and each node 1421–1427 represents the target of the respective annotated anchor. For example, annotation 1417 represents an annotation made on an anchor which points to a document tilted xclipboard, and node 1427 represents target document xclipboard.

FIG. 15 illustrates another hypertext structure 1500 containing propagated annotations, according to an embodiment of the present invention. In FIG. 15 each node in the hypertext structure 1500, such as nodes 1501, 1502, and 1503 represent a document. The link lines interconnecting each node, such as link lines 1505, 1507, and 1509 represent a link, either unidirectional or bi-directional, between documents. Annotations 1511, and 1513 illustrate annotations which have been propagated to a node 1521, and 1523 using the process of propagating annotations to hypertext structures 414 illustrated in FIG. 13. Each annotation 1511–1513 represents an annotation made by a reader on an anchor, and each node 1521–1523 represents the target of the respective annotated anchor. For example, annotation 1511 represents an annotation made on an anchor which points to a document tilted human factors, and node 1523 represents target document electronic mail.

Additionally, in an embodiment, the system can display on the hypertext structure 1500 what document the annotation is being propagated from by altering the representation of the link line. For example, link line 1531 is displayed thicker than the other link lines and with an arrow, thereby indicating that annotation 1511 is being propagated from document 1502. Accordingly, document 1502 contains an anchor to document 1521 which has been annotated by a reader using a check mark.

In an embodiment, a user may select to have annotations made in a document propagated to the node representing the document in which the annotation is actually contained. For example, referring again to FIG. 14, if a user made annotation 1413 in a document titled pbmtogem.1, the annotation would be propagated to node 1423 in the hypertext structure 1400 which represents document pbmtogem.1.

Additionally, in an embodiment, anchors which have been marked by a reader as uninteresting may have the node and/or the link line which corresponds to the uninteresting anchor and link suppressed in the display of the hypertext structure 1400. For example, referring to FIG. 15, a user has marked in a document represented by node 1541 an anchor which points to a target represented by node 1543 as uninteresting. Accordingly, link line 1545 has been suppressed and node 1543 has been suppressed 1547.

Once a reader has decided to follow an annotated anchor, either from a to-read list, from an actual annotation, from a hypertext structure, or from any other location, the system will display the target of the annotated anchor and either some or all of the annotations which include an anchor to the target.

Figure 16:
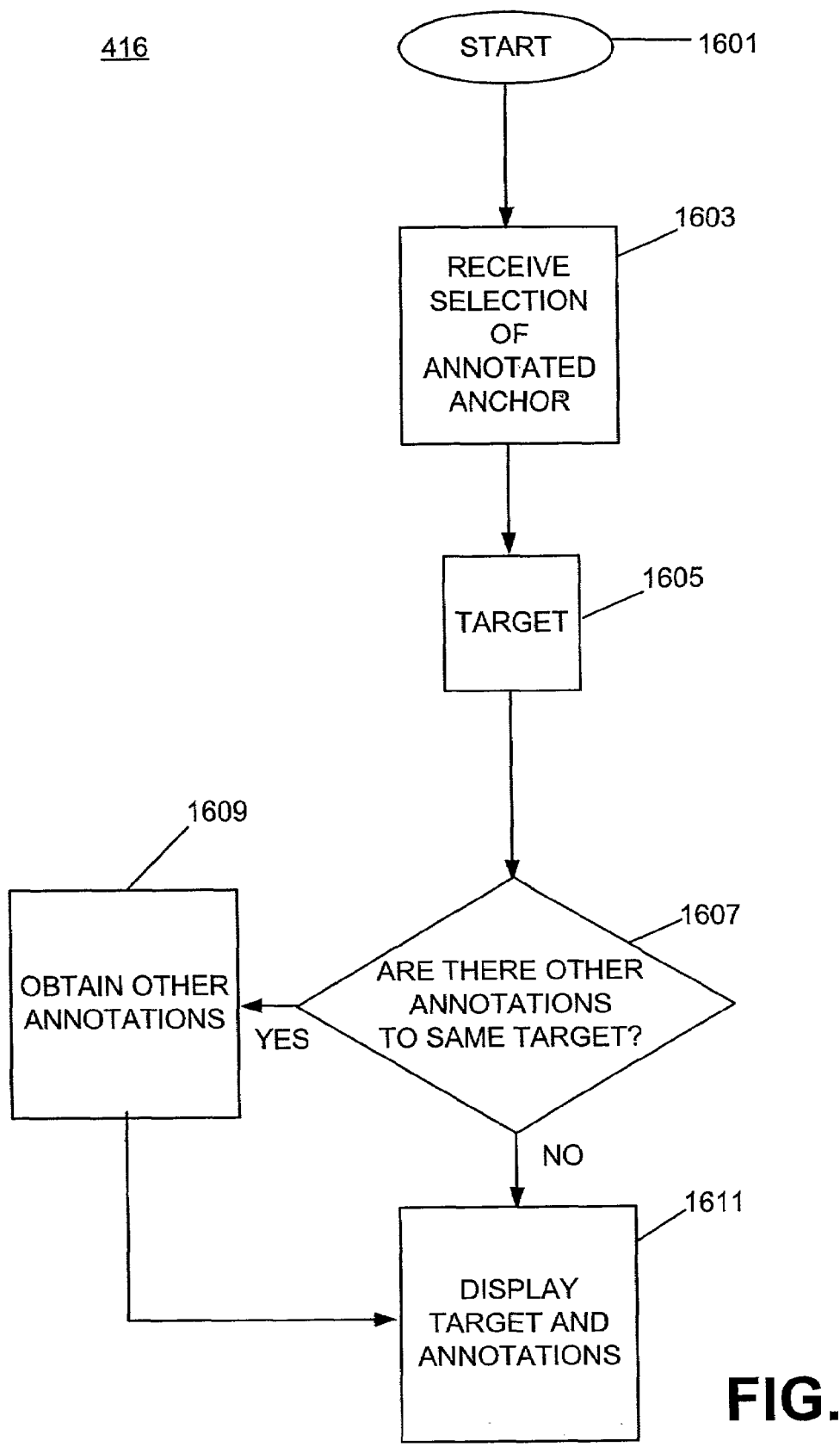
FIG. 16 is a flowchart outlining the process of displaying annotated anchors together with a target, according to an embodiment of the present invention; and, FIG. 17 illustrates an example of output resulting from the process of displaying annotated anchors together with a target, according to an embodiment of the present invention.

FIG. 16 illustrates a flowchart outlining the process of displaying annotated anchors together with target 416 of FIG. 4, according to an embodiment of the present invention. The process begins at logic box 1601 and control is passed to logic box 1603 where the system receives a selection by a reader of an annotated anchor. This selection may be from any of the outputs of the above-described processes or directly from a document.

In logic box 1605 the target of the selected annotated anchor is determined and obtained. In logic box 1607 a determination is made as to whether there are other annotated anchors which point to the same target. If it is determined that other annotated anchors point to the same target control is passed to logic box 1609 and each of the other annotated anchors which point to the same target are gathered. If however, it is determined that there are no other annotated anchors which point to the target control is passed to logic box 1611.

In logic box 1611 the target and each of the annotated anchors which point to the target are displayed on display 240 so that all information is simultaneously viewable.

FIG. 17 illustrates an example of an output generated from the process of displaying annotated anchors together with target document 416, illustrated in FIG. 16, according to an embodiment of the present invention. Once a reader has selected an anchor, the annotation 1701 which includes the selected anchor, any other annotated anchor which points to the same target, and the target 1703 are made viewable. By displaying one or more annotated anchors together with a target, the system reminds the reader of why they decided to read the target 1703, and where they have seen references to the target 1703 before. The annotated anchors may also help the reader interpret the target.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A system for detecting an annotated anchor in a displayed electronic document stored in a processor-readable storage medium, comprising:

a first code in the processor-readable storage medium for locating an annotation on the displayed electronic document, wherein the annotation can be positioned anywhere on the displayed electronic document by the reader; and, a second code in the processor-readable storage medium for detecting the closest anchor to the annotation, wherein the processor-readable storage medium communicates the first code and the second code to a processor to detect the annotated anchor on the displayed electronic document and to perform at least one process on the annotated anchor.

2. The system of claim 1 wherein said second code detects an anchor which represents an explicit link to at least one other location.

3. The system of claim 1 wherein said second code detects an anchor which represents an implicit link to at least one other location.

4. The system of claim 1 further including a data structure referencing said annotated anchor.

5. The system of claim 1 further including a third code in the processor-readable storage medium for processing said annotated anchor.

6. The system of claim 5 wherein said third code for processing said annotated anchor includes generating a data structure including said annotated anchor.

7. The system of claim 6 wherein said data structure includes a plurality of annotated anchors.

8. The system of claim 7 wherein said plurality of annotated anchors are obtained from at least one electronic document.

9. The system of claim 7 wherein said plurality of annotated anchors in said data structure are displayed in a format.

10. The system of claim 9 wherein said format includes displaying said plurality of annotated anchors according to annotation metadata.

11. The system of claim 9 wherein said format includes displaying said plurality of annotated anchors according to annotated anchor metadata.

12. The system of claim 11 wherein said plurality of annotated anchors each represent a link to at least one target; and wherein said annotated anchor metadata includes a number of anchors within said displayed electronic document representing said target.

13. The system of claim 11 wherein said plurality of annotated anchors each represent a link to at least one target; and wherein said annotated anchor metadata includes a number of annotated anchors representing said target.

14. The system of claim 9 wherein said plurality of annotated anchors each represent a link to at least one target; and wherein said format includes displaying said annotated anchors according to target metadata.

15. The system of claim 14 wherein said target is a second electronic document.

16. The system of claim 5 wherein said third code for processing said annotated anchor further comprises causing the system to add said annotated anchor to a data structure based on at least one attribute value.

17. The system of claim 16 wherein said data structure includes a plurality of annotated anchors which have said at least one attribute value.

18. The system of claim 17 wherein said plurality of annotated anchors which have said at least one attribute value are obtained from a plurality of electronic documents.

19. The system of claim 17 wherein said plurality of annotated anchors which have said at least one attribute value in said data structure are displayed in a format.

20. The system of claim 19 wherein said format includes displaying said annotated anchors which have said at least one attribute value according to annotation metadata.

21. The system of claim 19 wherein said format includes displaying said annotated anchors which have said at least one attribute value according to annotated anchor metadata.

22. The system of claim 19 wherein said annotated anchors which have said at least one attribute value each represent a link to at least one target; and wherein said format includes displaying said annotated anchors which have said at least one attribute value according to target metadata.

23. The system of claim 22 wherein said target is a second electronic document.

24. The system of claim 5 wherein said annotated anchor represents a link to at least a first target; and wherein said third code for processing said annotated anchor includes locating a second electronic document which includes a reference to said first target.

25. The system of claim 24 wherein said second electronic document contains a second annotated anchor representing a link to at least a second target; and wherein said third code for processing said annotated anchor includes locating at least a second electronic document which includes a reference to said first and second targets.

26. The system of claim 5 wherein said annotated anchor represents a link to at least a second electronic document; and wherein said third code for processing said annotated anchor includes obtaining said second electronic document.

27. The system of claim 26 wherein said second electronic document is obtained prior to a reader requesting said second electronic document.

28. The system of claim 5 wherein said annotated anchor represents a link to at least one target; and wherein said third code for processing said annotated anchor includes detecting a second anchor representing a link to said target; and propagating said annotation to said second anchor.

29. The system of claim 28 wherein said second anchor is within said electronic document.

30. The system of claim 28 wherein said second anchor is within a second electronic document.

31. The system of claim 5 wherein said annotated anchor represents a link to at least one target; and wherein said third code for processing said annotated anchor includes detecting a second anchor representing a link to said target; and suppressing a display of said second anchor.

32. The system of claim 31 wherein said second anchor is within said electronic document.

33. The system of claim 31 wherein said second anchor is within a second electronic document.

34. The system of claim 5 wherein said annotated anchor represents a link to at least one target; and wherein said third code for processing said annotated anchor includes identifying, in a hypertext structure, a node representing said target; and propagating said annotation to said node.

35. The system of claim 34 wherein said code for processing includes identifying, in said hypertext structure, a connecting object representing said link, and altering said connecting object.

36. The system of claim 5 wherein said annotated anchor represents a link to at least one target; and wherein said third code for processing said annotated anchor includes identifying, in a hypertext structure, a node representing said target; and suppressing a display of said node.

37. The system of claim 36 wherein said third code for processing said annotated anchor includes identifying, in said hypertext structure, an object representing said link and suppressing a display of said object.

38. The system of claim 5 wherein said annotated anchor represents a link to at least one target; and wherein said third code for processing said annotated anchor includes displaying said annotated anchor and said target.

39. A method for detecting and processing a plurality of annotated anchors in a plurality of electronic documents stored in a processor-readable storage medium, comprising the steps of:
   (a) locating an annotation in a displayed electronic document stored in the processor-readable storage medium, wherein the annotation can be positioned anywhere on the displayed electronic document by the reader;
   (b) detecting the closest anchor to the annotation,
   (c) processing the annotated anchor wherein the processing step further comprises adding the annotated anchor to a data structure of annotated anchors; and displaying the data structure of the annotated data anchors; and,
   (d) repeating steps (a)–(c) for each annotation in the plurality of electronic documents.

40. The method of claim 39 wherein step (c) includes the steps of:
   adding annotated anchors including at least one selected attribute to a data structure.

41. The method of claim 39 wherein said annotated anchors each represent a link to at least one target; and wherein step (c) includes the step of:
   locating at least a second electronic document which includes a reference to at least one of said targets.

42. The method of claim 39 wherein at least one of said annotated anchors represent a link to a second electronic document; and wherein step (c) includes the steps of:
   determining whether said second electronic document is stored in said system; and
   obtaining said second electronic document if not already stored.

43. The method of claim 39 wherein step (c) includes the steps of:
   determining a target of said annotated anchor;
   detecting a second anchor representing a link to said target and,
   propagating said annotation to said second anchor.

44. The method of claim 39 wherein step (e) includes the steps of:
   determining a target of said annotated anchor;
   detecting a second anchor representing a link to said target; and,
   suppressing a display of said second anchor.

45. The method of claim 39 wherein step (c) includes the steps of:
   determining a target of said annotated anchor;
   detecting a node, in a hypertext structure, representing said target; and,
   propagating said annotation to said node.

46. The method of claim 45 wherein said annotated anchor represents a link to said target; and wherein step (c) further includes the steps of:
   detecting an object, in said hypertext structure, representing said link; and,
   altering said object.

47. The method of claim 39 wherein step (c) includes the steps of:
   determining a target of said annotated anchor;
   detecting a node, in a hypertext structure, representing said target; and,
   suppressing said node.

48. The method of claim 47 wherein said annotated anchor represents a link to said target; and wherein step (c) further includes the steps of:
   detecting an object, in the hypertext structure, representing said link; and,
   suppressing the display of said object.

49. The method of claim 39 wherein said annotated anchor represents a link to at least one target; and wherein step (c) includes the step of:
   displaying simultaneously, said annotated anchor and said target.

50. An apparatus for detecting at least one annotated anchor in an electronic document stored in a processor-readable storage medium, the apparatus comprising:
   a processor;
   the processor-readable storage medium in communication with the processor, containing processor-readable program code for programming the apparatus to;
   detect each annotation in the electronic document, wherein the annotation can be positioned anywhere on the displayed electronic document by the reader;
   detect the closest anchor to each annotation; and,
   generate a data structure including each annotated anchor.

51. The apparatus of claim 50 further including processor readable program code for programming the apparatus to:
   filter the data structure to include only annotated anchors which contain at least one selected attribute.

52. The apparatus of claim 50 further including processor readable program code for programming the apparatus to:
   locate a second electronic document containing a reference to at least one of said annotated anchors included in said data structure.

53. The apparatus of claim 50 further including processor readable program code for programming the apparatus to:
   determine a target electronic document for each annotated anchor included in said data structure;
   identify whether the target electronic document is stored within the apparatus;
   obtain a copy of the target electronic document if not stored.

54. The apparatus of claim 50 further including processor readable program code for programming the apparatus to:
   determine a target electronic document for said annotated anchor;
   identify additional anchors which represent a link to said target electronic document; and
   propagate said annotation to said identified additional anchors.

55. The apparatus of claim 50 further including processor readable program code for programming the apparatus to:
   determine a target for said annotated anchor;
   identify, in a hypertext structure, a node representing said target; and
   propagate said annotation to said node.

* * * * *